(12) United States Patent
Arar et al.

(10) Patent No.: US 11,978,266 B2
(45) Date of Patent: May 7, 2024

(54) OCCUPANT ATTENTIVENESS AND COGNITIVE LOAD MONITORING FOR AUTONOMOUS AND SEMI-AUTONOMOUS DRIVING APPLICATIONS

(71) Applicant: NVIDIA Corporation, Santa Clara, CA (US)

(72) Inventors: Nuri Murat Arar, Zurich (CH); Niranjan Avadhanam, Saratoga, CA (US); Yuzhuo Ren, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 818 days.

(21) Appl. No.: 17/076,690

(22) Filed: Oct. 21, 2020

(65) Prior Publication Data

US 2022/0121867 A1    Apr. 21, 2022

(51) Int. Cl.
*G06V 20/56* (2022.01)
*B60W 30/095* (2012.01)
(Continued)

(52) U.S. Cl.
CPC ....... *G06V 20/597* (2022.01); *B60W 30/0956* (2013.01); *B60W 40/08* (2013.01); (Continued)

(58) Field of Classification Search
CPC ........ G06V 20/56; B60W 40/08; B60W 50/14
See application file for complete search history.

(56) References Cited

U.S. PATENT DOCUMENTS 2,631,498 A    3/1953    Barkley
5,909,190 A    6/1999    Lo et al.
(Continued)

FOREIGN PATENT DOCUMENTS

CN    102712317 A    10/2012
CN    105835874 A    8/2016
(Continued)

OTHER PUBLICATIONS

"Unconstrained Appearance-Based Ocular Inference", U.S. Appl. No. 62/439,870, filed Dec. 28, 2016.
(Continued)

*Primary Examiner* — Sam Bhattacharya
(74) *Attorney, Agent, or Firm* — Taylor English Duma L.L.P.

(57) ABSTRACT

In various examples, estimated field of view or gaze information of a user may be projected external to a vehicle and compared to vehicle perception information corresponding to an environment outside of the vehicle. As a result, interior monitoring of a driver or occupant of the vehicle may be used to determine whether the driver or occupant has processed or seen certain object types, environmental conditions, or other information exterior to the vehicle. For a more holistic understanding of the state of the user, attentiveness and/or cognitive load of the user may be monitored to determine whether one or more actions should be taken. As a result, notifications, AEB system activations, and/or other actions may be determined based on a more complete state of the user as determined based on cognitive load, attentiveness, and/or a comparison between external perception of the vehicle and estimated perception of the user.

20 Claims, 11 Drawing Sheets

(51) Int. Cl.
 *B60W 40/08* (2012.01)
 *B60W 50/14* (2020.01)
 *B60W 60/00* (2020.01)
 *G06V 20/59* (2022.01)
 *B60W 30/09* (2012.01)

(52) U.S. Cl.
 CPC .......... *B60W 50/14* (2013.01); *B60W 60/001* (2020.02); *G06V 20/56* (2022.01); *B60W 30/09* (2013.01); *B60W 2540/22* (2013.01); *B60W 2540/221* (2020.02); *B60W 2540/223* (2020.02); *B60W 2540/225* (2020.02)

(56) References Cited

U.S. PATENT DOCUMENTS

| | | |
|---|---|---|
| 7,409,295 B2 | 8/2008 | Paradie |
| 7,693,683 B2 | 4/2010 | Ihara |
| 8,204,542 B2 | 6/2012 | Liao et al. |
| 8,204,642 B2 | 6/2012 | Tanaka et al. |
| 8,385,676 B2 | 2/2013 | Weinberger et al. |
| 8,503,801 B2 | 8/2013 | Schiller et al. |
| 8,554,715 B2 | 10/2013 | Kraaij et al. |
| 8,837,819 B1 | 9/2014 | Lees et al. |
| 8,929,683 B2 | 1/2015 | Gallo et al. |
| 9,087,297 B1 | 7/2015 | Filippova et al. |
| 9,098,751 B2 | 8/2015 | Hilldore et al. |
| 9,373,057 B1 | 6/2016 | Erhan et al. |
| 9,623,905 B2 | 4/2017 | Shashua et al. |
| 9,701,307 B1 | 7/2017 | Newman et al. |
| 9,710,714 B2 | 7/2017 | Chen et al. |
| 9,721,471 B2 | 8/2017 | Chen et al. |
| 9,738,125 B1 | 8/2017 | Brickley et al. |
| 9,742,869 B2 | 8/2017 | Bolotin et al. |
| 9,911,050 B2 | 3/2018 | Lynam et al. |
| 10,007,269 B1 | 6/2018 | Gray |
| 10,108,260 B2 | 10/2018 | Park et al. |
| 10,108,867 B1 | 10/2018 | Vallespi-Gonzalez et al. |
| 10,133,274 B2 | 11/2018 | Shashua et al. |
| 10,134,278 B1 | 11/2018 | Konrardy et al. |
| 10,157,331 B1 | 12/2018 | Tang et al. |
| 10,262,213 B2 | 4/2019 | Chen et al. |
| 10,262,239 B2 | 4/2019 | Polak et al. |
| 10,282,995 B2 | 5/2019 | Heinla et al. |
| 10,289,469 B2 | 5/2019 | Fortino et al. |
| 10,296,083 B2 | 5/2019 | Sung |
| 10,372,136 B2 | 8/2019 | Yang et al. |
| 10,373,332 B2 | 8/2019 | Gu et al. |
| 10,380,886 B2 | 8/2019 | Ran et al. |
| 10,482,328 B2 | 11/2019 | Varadarajan et al. |
| 10,482,350 B2 | 11/2019 | Liu et al. |
| 10,489,972 B2 | 11/2019 | Atsmon |
| 10,580,158 B1 | 3/2020 | Mousavian et al. |
| 10,586,456 B2 | 3/2020 | Wang |
| 10,625,748 B1 | 4/2020 | Dong et al. |
| 10,635,110 B2 | 4/2020 | Shashua et al. |
| 10,730,517 B2 | 8/2020 | Park et al. |
| 10,739,778 B2 | 8/2020 | Winkler et al. |
| 10,740,954 B2 | 8/2020 | Liu |
| 10,761,535 B2 | 9/2020 | Chen et al. |
| 10,776,985 B2 | 9/2020 | Liu et al. |
| 10,816,978 B1 | 10/2020 | Schwalb |
| 10,829,116 B2 | 11/2020 | Iagnemma et al. |
| 10,829,793 B2 | 11/2020 | Arikawa et al. |
| 10,832,439 B1 | 11/2020 | Ma et al. |
| 10,885,698 B2 | 1/2021 | Muthler et al. |
| 10,915,731 B2 | 2/2021 | Mccormac et al. |
| 10,917,590 B2 | 2/2021 | Hyuga |
| 10,942,030 B2 | 3/2021 | Haque et al. |
| 10,977,524 B2 | 4/2021 | Samala et al. |
| 11,042,163 B2 | 6/2021 | Chen et al. |
| 11,132,543 B2 | 9/2021 | Ranjan et al. |
| 11,210,537 B2 | 12/2021 | Koivisto et al. |
| 11,321,924 B2 | 5/2022 | Molyneaux et al. |
| 2004/0016870 A1 | 1/2004 | Pawlicki et al. |
| 2004/0252864 A1 | 12/2004 | Chang et al. |
| 2005/0196034 A1 | 9/2005 | Hattori et al. |
| 2007/0154068 A1 | 7/2007 | Stein et al. |
| 2007/0182528 A1 | 8/2007 | Breed et al. |
| 2008/0266396 A1 | 10/2008 | Stein |
| 2009/0088941 A1 | 4/2009 | Tsuchiya et al. |
| 2009/0097704 A1 | 4/2009 | Savidge et al. |
| 2009/0256840 A1 | 10/2009 | Varadhan et al. |
| 2010/0149193 A1 | 6/2010 | Yu |
| 2010/0322476 A1 | 12/2010 | Kanhere et al. |
| 2011/0044557 A1 | 2/2011 | Abraham et al. |
| 2012/0194516 A1 | 8/2012 | Newcombe et al. |
| 2012/0300061 A1 | 11/2012 | Osman et al. |
| 2013/0011012 A1 | 1/2013 | Yonaha et al. |
| 2013/0061033 A1 | 3/2013 | Kim et al. |
| 2013/0100286 A1 | 4/2013 | Lao |
| 2013/0106837 A1 | 5/2013 | Mukherjee et al. |
| 2013/0307771 A1 | 11/2013 | Parker et al. |
| 2014/0104424 A1 | 4/2014 | Zhang et al. |
| 2014/0118402 A1 | 5/2014 | Gallo et al. |
| 2014/0119595 A1 | 5/2014 | Gallo et al. |
| 2014/0210625 A1 | 7/2014 | Nemat-nasser |
| 2015/0054824 A1 | 2/2015 | Jiang |
| 2015/0067672 A1 | 3/2015 | Mitra et al. |
| 2015/0172626 A1 | 6/2015 | Martini |
| 2015/0278578 A1 | 10/2015 | Otsuka et al. |
| 2015/0304634 A1 | 10/2015 | Karvounis |
| 2015/0346716 A1 | 12/2015 | Scharfe et al. |
| 2016/0063720 A1 | 3/2016 | Han et al. |
| 2016/0100761 A1 | 4/2016 | Cruchaga et al. |
| 2016/0202756 A1 | 7/2016 | Wu et al. |
| 2016/0247290 A1 | 8/2016 | Liu et al. |
| 2016/0321074 A1 | 11/2016 | Hung et al. |
| 2016/0364907 A1 | 12/2016 | Schoenberg |
| 2017/0010108 A1 | 1/2017 | Shashua |
| 2017/0060234 A1 | 3/2017 | Sung |
| 2017/0061625 A1 | 3/2017 | Estrada et al. |
| 2017/0061632 A1 | 3/2017 | Lindner et al. |
| 2017/0090478 A1 | 3/2017 | Blayvas et al. |
| 2017/0116781 A1 | 4/2017 | Babahajiani et al. |
| 2017/0124717 A1 | 5/2017 | Baruch et al. |
| 2017/0124758 A1 | 5/2017 | Jia et al. |
| 2017/0220876 A1 | 8/2017 | Gao et al. |
| 2017/0236013 A1 | 8/2017 | Clayton et al. |
| 2017/0259801 A1 | 9/2017 | Abou-Nasr et al. |
| 2017/0285741 A1 | 10/2017 | Park et al. |
| 2017/0344808 A1 | 11/2017 | El-Khamy et al. |
| 2017/0357862 A1 | 12/2017 | Tatsubori |
| 2017/0371340 A1 | 12/2017 | Cohen et al. |
| 2017/0371346 A1 | 12/2017 | Mei et al. |
| 2018/0005057 A1 | 1/2018 | Lee et al. |
| 2018/0089833 A1 | 3/2018 | Lewis et al. |
| 2018/0121273 A1 | 5/2018 | Fortino et al. |
| 2018/0136332 A1 | 5/2018 | Barfield et al. |
| 2018/0158244 A1 | 6/2018 | Ybanez Zepeda et al. |
| 2018/0164812 A1 | 6/2018 | Oh et al. |
| 2018/0188059 A1 | 7/2018 | Wheeler et al. |
| 2018/0203959 A1 | 7/2018 | Refsnaes et al. |
| 2018/0232663 A1 | 8/2018 | Ross et al. |
| 2018/0267558 A1 | 9/2018 | Tiwari et al. |
| 2018/0276278 A1 | 9/2018 | Cagan et al. |
| 2018/0300590 A1 | 10/2018 | Briggs et al. |
| 2018/0304468 A1 | 10/2018 | Holz |
| 2018/0348374 A1 | 12/2018 | Laddha et al. |
| 2018/0349746 A1 | 12/2018 | Vallespi-Gonzalez |
| 2018/0370540 A1 | 12/2018 | Yousuf et al. |
| 2018/0373980 A1 | 12/2018 | Huval |
| 2019/0016285 A1 | 1/2019 | Freienstein et al. |
| 2019/0034831 A1 | 1/2019 | Perona et al. |
| 2019/0061771 A1 | 2/2019 | Bier et al. |
| 2019/0065933 A1 | 2/2019 | Bogdoll et al. |
| 2019/0066328 A1 | 2/2019 | Kwant et al. |
| 2019/0071101 A1 | 3/2019 | Emura et al. |
| 2019/0080149 A1 | 3/2019 | Gernoth et al. |
| 2019/0080467 A1 | 3/2019 | Hirzer et al. |
| 2019/0101399 A1 | 4/2019 | Sunil Kumar et al. |
| 2019/0102646 A1 | 4/2019 | Redmon et al. |
| 2019/0102668 A1 | 4/2019 | Yao et al. |
| 2019/0120640 A1 | 4/2019 | Ho et al. |

(56) References Cited

U.S. PATENT DOCUMENTS

| | | | |
|---|---|---|---|
| 2019/0129831 A1 | 5/2019 | Goldberg | |
| 2019/0146497 A1 | 5/2019 | Urtasun et al. | |
| 2019/0146500 A1 | 5/2019 | Yalla et al. | |
| 2019/0147600 A1 | 5/2019 | Karasev et al. | |
| 2019/0147610 A1 | 5/2019 | Frossard et al. | |
| 2019/0171912 A1 | 6/2019 | Vallespi-Gonzalez et al. | |
| 2019/0179979 A1 | 6/2019 | Melick | |
| 2019/0189001 A1 | 6/2019 | Smothers et al. | |
| 2019/0197774 A1 | 6/2019 | Molyneaux et al. | |
| 2019/0213429 A1 | 7/2019 | Sicconi et al. | |
| 2019/0213481 A1 | 7/2019 | Godard et al. | |
| 2019/0235515 A1 | 8/2019 | Shirvani et al. | |
| 2019/0243371 A1 | 8/2019 | Nister et al. | |
| 2019/0250622 A1 | 8/2019 | Nister et al. | |
| 2019/0251442 A1 | 8/2019 | Koivisto et al. | |
| 2019/0258251 A1 | 8/2019 | Ditty et al. | |
| 2019/0302761 A1 | 10/2019 | Huang et al. | |
| 2019/0370580 A1 | 12/2019 | Aoi et al. | |
| 2020/0013176 A1 | 1/2020 | Kang et al. | |
| 2020/0090322 A1 | 3/2020 | Seo et al. | |
| 2020/0117213 A1 | 4/2020 | Tian et al. | |
| 2020/0117898 A1 | 4/2020 | Tian et al. | |
| 2020/0143205 A1 | 5/2020 | Yao et al. | |
| 2020/0160559 A1 | 5/2020 | Urtasun et al. | |
| 2020/0175311 A1 | 6/2020 | Xu et al. | |
| 2020/0207358 A1 | 7/2020 | Katz et al. | |
| 2020/0257306 A1 | 8/2020 | Nisenzon | |
| 2020/0293064 A1 | 9/2020 | Wu et al. | |
| 2020/0310548 A1 | 10/2020 | Wieczorek et al. | |
| 2020/0324795 A1 | 10/2020 | Bojarski et al. | |
| 2021/0025696 A1 | 1/2021 | Goto et al. | |
| 2021/0064980 A1 | 3/2021 | Heinrich et al. | |
| 2021/0089794 A1 | 3/2021 | Chen et al. | |
| 2021/0104068 A1 | 4/2021 | Marks et al. | |
| 2021/0150722 A1 | 5/2021 | Homayounfar et al. | |
| 2021/0286923 A1 | 9/2021 | Kristensen et al. | |
| 2021/0295481 A1 | 9/2021 | Kato et al. | |
| 2021/0300379 A1 | 9/2021 | Hackeloeer et al. | |
| 2022/0132145 A1 | 4/2022 | Choi et al. | |

FOREIGN PATENT DOCUMENTS

| | | |
|---|---|---|
| CN | 107415938 A | 12/2017 |
| CN | 108068821 A | 5/2018 |
| CN | 110211586 A | 9/2019 |
| CN | 110626356 A | 12/2019 |
| DE | 10 2015 221 920 A1 | 5/2017 |
| DE | 10 2015 226 762 A1 | 6/2017 |
| EP | 1510973 A2 | 3/2005 |
| EP | 1 930 863 A2 | 6/2008 |
| EP | 1 930 868 A1 | 6/2008 |
| EP | 2 384 009 A2 | 11/2011 |
| EP | 3 171 297 A1 | 5/2017 |
| EP | 3 441 909 A1 | 2/2019 |
| JP | 2003308522 A | 10/2003 |
| JP | 2012187178 A | 10/2012 |
| JP | 2015194884 A | 11/2015 |
| JP | 2019165391 A | 9/2019 |
| KR | 10-2012-0009590 A | 2/2012 |
| RU | 2358319 C2 | 6/2009 |
| WO | 2012/011713 A2 | 1/2012 |
| WO | 2016/183074 A1 | 11/2016 |
| WO | 2017/177128 A1 | 10/2017 |
| WO | 2017/220705 A1 | 12/2017 |
| WO | 2018/002910 A1 | 1/2018 |
| WO | 2018/102717 A1 | 6/2018 |

OTHER PUBLICATIONS

"Landmark Detection With Semi-Supervised Learning", U.S. Appl. No. 62/522,520, filed Jun. 20, 2017.

"Methodology of Using a Single Controller (ECU) For a Fault-Tolerant/Fail-Operational Self-Driving System", U.S. Appl. No. 62/524,283, filed Jun. 23, 2017.

"Systems and Methods for Safe and Reliable Autonomous Vehicles", U.S. Appl. No. 62/584,549, filed Nov. 10, 2017.

"System and Method for Controlling Autonomous Vehicles", U.S. Appl. No. 62/614,466, filed Jan. 7, 2018.

"Detection of Hazardous Autonomous Driving Using Machine Learning", U.S. Appl. No. 62/622,538, filed Jan. 26, 2018.

"System and Method for Safe Operation of Autonomous Vehicles", U.S. Appl. No. 62/625,351, filed Feb. 2, 2018.

"Conservative Control for Zone Driving of Autonomous Vehicles", U.S. Appl. No. 62/628,831, filed Feb. 9, 2018.

"Systems and Methods for Sharing Camera Data Between Primary and Backup Controllers in Autonomous Vehicle Systems", U.S. Appl. No. 62/629,822, filed Feb. 13, 2018.

"Pruning Convolutional Neural Networks for Autonomous Vehicles and Robotics", U.S. Appl. No. 62/630,445, filed Feb. 14, 2018.

"Methods for accurate real-time object detection and for determining confidence of object detection suitable for Autonomous vehicles", U.S. Appl. No. 62/631,781, filed Feb. 18, 2018.

"System and Method for Autonomous Shuttles, Robo-Taxis, Ride-Sharing and On-Demand Vehicles", U.S. Appl. No. 62/635,503, filed Feb. 26, 2018.

"Methods for Accurate Real-time Lane and Road Boundary Detection for Autonomous Driving", U.S. Appl. No. 62/636,142, filed Feb. 27, 2018.

"Convolutional Neural Networks to Detect Drivable Freespace for Autonomous Vehicles", U.S. Appl. No. 62/643,665, filed Mar. 15, 2018.

"Energy Based Reflection Filter for Denoising Ray-Traced Glossy Reflections", U.S. Appl. No. 62/644,386, filed Mar. 17, 2018.

"Geometric Shadow Filter for Denoising Ray-Traced Shadows", U.S. Appl. No. 62/644,385, filed Mar. 17, 2018.

"Adaptive Occlusion Sampling of Rectangular Area Lights with Voxel Cone Tracing", U.S. Appl. No. 62/644,806, filed Mar. 19, 2018.

"Distance Based Ambient Occlusion Filter for Denoising Ambient Occlusions", U.S. Appl. No. 62/644,601, filed Mar. 19, 2018.

"Deep Neural Network for Estimating Depth from Stereo Using Semi-Supervised Learning", U.S. Appl. No. 62/646,148, filed Mar. 21, 2018.

"Video Prediction Using Spatially Displaced Convolution", U.S. Appl. No. 62/646,309, filed Mar. 21, 2018.

"Video Prediction Using Spatially Displaced Convolution", U.S. Appl. No. 62/647,545, filed Mar. 23, 2018.

"Network Injection Rate Limiting", U.S. Appl. No. 62/648,326, filed Mar. 26, 2018.

"Network Synchronization Using Posted Operation Tracking For Flush Semantics", U.S. Appl. No. 62/648,333, filed Mar. 26, 2018.

"System and Methods for Advanced Al-Assisted Vehicles", U.S. Appl. No. 62/648,358, filed Mar. 26, 2018.

"Method and System of Remote Operation of a Vehicle Using an Immersive Virtual Reality Environment", U.S. Appl. No. 62/648,493, filed Mar. 27, 2018.

"System and Method for Training, Testing, Verifying, and Validating Autonomous and Semi-Autonomous Vehicles", U.S. Appl. No. 62/648,399, filed Mar. 27, 2018.

"System and Methods for Virtualized Intrusion Detection and Prevent System in Autonomous Vehicles", U.S. Appl. No. 62/682,803, filed Jun. 8, 2018.

"Deep Learning for Path Detection in Autonomous Vehicles", U.S. Appl. No. 62/684,328, filed Jun. 13, 2018.

"Methods for High-Precision, High-Accuracy Lane Detection in Autonomous Driving Applications", U.S. Appl. No. 62/699,669, filed Jul. 17, 2018.

"System and Methods for Gaze, Body, and Gesture Recognition in Advanced Al-Assisted Vehicles", U.S. Appl. No. 62/742,923, filed Oct. 8, 2018.

"Distance to Obstacle Detection in Autonomous Driving Applications", U.S. Appl. No. 62/786,188, filed Dec. 28, 2018.

"Detection and Classification of Wait Conditions in Autonomous Driving Applications", U.S. Appl. No. 62/816,838, filed Mar. 11, 2019.

(56) References Cited

OTHER PUBLICATIONS

"Intersection Detection and Handling Using Live Perception in Autonomous Driving Applications", U.S. Appl. No. 62/839,155, filed Apr. 26, 2019.

"Intersection Contention Area Detection Using Live Perception in Autonomous Driving Applications", U.S. Appl. No. 62/866,158, filed Jun. 25, 2019.

"Gaze Determination Machine Learning System Having Adaptive Weighting of Inputs", U.S. Appl. No. 62/948,789, filed Dec. 16, 2019.

U.S. Provisional Patent Application entitled "Gaze Determination Using Glare as Input" having docket #s 19-SC-0390 and 000181-0014-001, and having a filing date of Dec. 16, 2019.

"Neural Network Based Facial Analysis Using Facial Landmarks and Associated Confidence Values", U.S. Appl. No. 62/948,796, filed Dec. 16, 2019.

Dipietro, R., "A Friendly Introduction to Cross-Entropy Loss," Version 0.1, Accessed on Feb. 21, 2019 at: https:/rdipietro.github.io/friendly-intro-to-cross-entropy-loss/, pp. 1-10 (May 2, 2016).

Du, L., and Du, Y., "Hardware Accelerator Design for Machine Learning", Machine Learning-Advanced Techniques and Emerging Applications, pp. 1-14 (2017).

Eigen, D., et al., "Depth Map Prediction from a Single Image using a Multi-Scale Deep Network", NIPS, pp. 1-9, (2014).

Elfes, A., "Sonar-Based Real-World Mapping and Navigation", IEEE Journal on Robotics and Automation, vol. 3, Issue: 3, pp. 249-265 (Jun. 1987).

Foley, D., and Danskin, J., "Ultra-Performance Pascal GPU and NVLink Interconnect," IEEE Computer Society, IEEE Micro, vol. 37, No. 2, pp. 1-11 (Mar./Apr. 2017).

Franke, U., and Kutzbach., I., "Fast Stereo Based Object Detection for Stop & Go Traffic", pp. 1-6 (1996).

Fukunaga, K., and Hostetler, L., "The estimation of the gradient of a density function, with applications in pattern recognition", IEEE Transactions on Information Theory, vol. 21, No. 1, pp. 32-40 (Jan. 1975).

Gao, J., et al., "Embedding Structured Contour and Location Prior in Siamesed Fully Convolutional Networks for Road Detection", in IEEE Transactions on Intelligent Transportation Systems, vol. 19, No. 1, pp. 1-6 (Jan. 2018).

Garg, R., et al., "Unsupervised CNN for Single View Depth Estimation: Geometry to the Rescue", ECCV 2016, pp. 1-16 (Jul. 29, 2016).

Garnett, N., et al., "Real-Time Category-Based and General Obstacle Detection for Autonomous Driving", IEEE International Conference on Computer Vision Workshops (ICCVW), IEEE, pp. 198-205 (2017).

Geiger, A., et al., "Vision meets Robotics: The KITTI Dataset", The International Journal of Robotics Research, pp. 1-6 (2013).

Gidaris, S., and Komodakis, N., "Detect, Replace, Refine: Deep Structured Prediction For Pixel Wise Labeling", Computer Vision and Pattern Recognition, pp. 1-21 (Dec. 14, 2016).

Godard, C., et al., "Unsupervised Monocular Depth Estimation with Left-Right Consistency", IEEE Computer Society Conference on Computer Vision and Pattern Recognition, pp. 270-279 (Jul. 21, 2017).

Gregory, R. L., "Eye and brain : The psychology of seeing", World University Library, pp. 130 (1966) (PART 1).

Gregory, R. L., "Eye and brain : The psychology of seeing", World University Library, pp. 130 (1966) (PART 2).

Guney, F., et al., Displets: Resolving Stereo Ambiguities using Object Knowledge:, IEEE Conference on Computer Vision and Pattern Recognition (CVPR), pp. 1-11 (Jun. 7-12, 2015).

Habermann, M., et al., "Deepcap: Monocular Human Performance Capture Using Weak Supervision", in Proceedings of the IEEE/CVF Conference on Computer Vision and Pattern Recognition, pp. 1-12 (2020).

Han, S., et al., "Learning Both Weights and Connections For Efficient Neural Networks", arXiv:1506.02626v3 [cs.NE], pp. 1-9 (Oct. 30, 2015).

Hartley, R., and Zisserman, A., "Multiple View Geometry in Computer Vision", Cambridge University Press, pp. 1-48 (2004).

Hassner, T., et al., "Effective Face Fractalization in Unconstrained Images", In Proceedings of the IEEE Conference on Computer Vision and Pattern Recognition, pp. 1-10 (2015).

He, K., et al., "Deep Residual Learning For Image Recognition", Proceedings of IEEE, Conference on Computer Vision and Pattern Recognition (CVPR), pp. 770-778 (2016).

He, L., et al., "Learning Depth from Single Images with Deep Neural Network Embedding Focal Length", arXiv:1803.10039v1 [cs.CV], pp. 1-14 (Mar. 27, 2018).

Hibbard, P. B., et al., "Magnitude, precision, and realism of depth perception in stereoscopic vision", Cognitive Research: Principles and Implications, vol. 2, pp. 1-11 (2017).

Hirschmuller, H.,"Stereo Processing By Semiglobal Matching and Mutual Information", IEEE Transactions on Pattern Analysis and Machine Intelligence, pp. 1-14 (2008).

Huval, Brody et al., "An Empirical Evaluation of Deep Learning on Highway Driving", Apr. 17, 2015, 7 pages. Available at: https://arxiv.org/pdf/1504.01716.pdf.

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

Ioffe, S., and Szegedy, C., "Batch Normalization: Accelerating Deep Network Training by Reducing Internal Covariate Shift", arXiv:1502.03167v3 [cs.LG], pp. 1-12 (Mar. 2, 2015), Available at: https://arxiv.org/abs/1502.03167.

Jaderberg, M., et al., "Spatial Transformer Networks", NIPS, pp. 1-9 (2015).

Jayaraman, A. et al., "Creating 3D Virtual Driving Environments for Simulation-Aided Development of Autonomous Driving and Active Safety", SAE Technical Paper Series, vol. 1, pp. 1-6 (Mar. 28, 2017).

John, V., et al., "Real-time road surface and semantic lane estimation using deep features", Signal, Image and Video Processing, vol. 12, pp. 1133-1140 (Mar. 8, 2018).

Kahou, S. E., et al., "Combining Modality Specific Deep Neural Networks for Emotion Recognition in Video", In Proceedings of the 15th ACM on International Conference on Multimodal Interaction (ICMI), pp. 1-8 (2013).

Kendall, A., et al., "End-to-end Learning of Geometry and Context for Deep Stereo Regression", pp. 66-75 (Mar. 13, 2017).

Kim, W.S., et al., "Depth map coding with distortion estimation of rendered view", Proceedings of SPIE, vol. 7543, Visual Information Processing and Communication, 75430B, pp. 1-11 (Jan. 17, 2010); doi: 10.1117/12.839030.

Kingma, D. P., and Ba, J. L., "Adam: A Method for Stochastic Optimization", published as a conference paper at CLR 2015, arXiv:1412.6980v9 [cs.LG], pp. 1-15 (Jan. 30, 2017).

Kokkinos, I., "Pushing the Boundaries of Boundary Detection using Deep Learning", Retrieved from the Internet: URL:http://arxiv.org/pdf/1511.07386v2.pdf, pp. 1-12 (2016).

Kovesi, P., "Good Colour Maps: How to Design Them" arXiv: 1509.03700, pp. 1-42 (Sep. 12, 2015).

Kunze, L., et al., "Reading between the Lanes: Road Layout Reconstruction from Partially Segmented Scenes", 2018 21st International Conference on Intelligent Transportation Systems (ITSC), pp. 401-408 (Nov. 4-7, 2018).

Kutulakos, K. N., and Seitz, S. M., "A Theory of Shape by Space Carving" International Journal of Computer Vision, vol. 38, No. 3, pp. 199-218 (2000).

Kuznietsov, Y., et al., "Semi-Supervised Deep Learning for Monocular Depth Map Prediction", Computer Vision and Pattern Recognition, pp. 6647-6655 (2017).

Laurentini, A., "How far 3D shapes can be understood from 2D silhouettes", IEEE Transactions on Pattern Analysis and Machine Intelligence, vol. 17, No. 2, pp. 188-195 (Feb. 1995).

(56) References Cited

OTHER PUBLICATIONS

Levi, D., et al., "Stixelnet: A Deep Convolutional Network For Obstacle Detection and Road Segmentation", 26th British Machine Vision Conference (BMVC), pp. 1-12 (2015).
Levin, C. A., and Haber, R. N., "Visual angle as a determinant of perceived interobject distance" Perception & Psychophysics volume, vol. 54, No. 2, pp. 250-259 (Mar. 1993).
Liang, Z., et al., "Learning for Disparity Estimation through Feature Constancy", Computer Vision and Pattern Recognition, pp. 2811-2820 (2018).
Liu, F., et al., "Learning Depth from Single Monocular Images Using Deep Convolutional Neural Fields", IEEE Transactions on Pattern Analysis and Machine Intelligence, pp. 1-16 (2015).
Liu, H. et al., "Neural Person Search Machines", IEEE International Conference on Computer Vision (ICCV), pp. 493-501 (2017).
Liu, Y., et al., "Exploring Disentangled Feature Representation Beyond Face Identification", In Proceedings of the IEEE Conference on Computer Vision and Pattern Recognition, pp. 1-10 (2018).
Long, J., et al.,"Fully Convolutional Networks for Semantic Segmentation", IEEE Computer Vision Foundation, CVPR, pp. 3431-3440 (Nov. 2015).
Luvizon, C., D., et al., "Multi-task Deep Learning for Real-Time 3D Human Pose Estimation and Action Recognition", IEEE Transactions on Pattern Analysis and Machine Intelligence, pp. 1-16 (2020).
Mayer, N., et al., "A Large Dataset to Train Convolutional Networks for Disparity, Optical Flow, and Scene Flow Estimation", IEEE Conference on Computer Vision and Pattern Recognition, pp. 1-14 (2016).
Fridman, L., Langhans, P., Lee, J., & Reimer, B. (2015). Driver gaze estimation without using eye movement. arXiv preprint arXiv:1507.04760, 2(4).
Naqvi, R. A., Arsalan, M., Batchuluun, G., Yoon, H. S., & Park, K. R. (2018). Deep learning-based gaze detection system for automobile drivers using a NIR camera sensor. Sensors, 18(2), 456.
Vora, S., Rangesh, A., & Trivedi, M. M. (2018). Driver gaze zone estimation using convolutional neural networks: A general framework and ablative analysis. IEEE Transactions on Intelligent Vehicles, 3(3), 254-265.
Chen, S., & Epps, J. (2013). Automatic classification of eye activity for cognitive load measurement with emotion interference. Computer methods and programs in biomedicine, 110(2), 111-124.
Fridman, L., Reimer, B., Mehler, B., & Freeman, W. T. (Apr. 2018). Cognitive load estimation in the wild. In Proceedings of the 2018 chi conference on human factors in computing systems (pp. 1-9).
"Euler spiral", Wikipedia, Retrieved from Internet URL : https://en.wikipedia.org/wiki/Euler_spiral, accessed on Feb. 21, 2019, pp. 10.
"F1 score", Wikipedia, Retrieved from Internet URL : https://en.wikipedia.org/wiki/F-score, accessed on Feb. 21, 2019, pp. 3.
"Implementation of Control Flow in TensorFlow" TensorFlow Authors, Retrieved from the Internet URL : http://download.tensorflow.org/paper/white_paper_tf_control_flow_implementation_2017_11_1.pdf, pp. 1-18 (Nov. 1, 2016).
"Neural Networks", Retrieved from Internet URL : https://www.tensorflow.org/api_guides/python/nn#conv2d_transpose, accessed on Mar. 1, 2019, pp. 14.
"Polynomial curve fitting", Retrieved from Internet URL : https://www.mathworks.com/help/matlab/ref/polyfit.html, accessed on Feb. 21, 2019, pp. 13.
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).
"tensorflow", Retrieved from the Internet URL :https://github.com/tensorflow/tensorflow/blob/master/tensorflow/core/kernels/hinge-loss.h, accessed on May 16, 2019, pp. 1-4.
"tf.while_loop much slower than static graph? #9527", tensorflow, Retrieved from the Internet URL : https://github.com/tensorflow/tensorflow/issues/9527,accessed on May 16, 2019, pp. 1-7.
"tf.losses.get_regularization_loss", TensorFlow Core 1.13, Retrieved from the Internet URL : https://www.tensorflow.org/api_docs/python/tf/losses/get_regularization_loss, accessed on May 16, 2019, pp. 1-1.
What is polyline?, Webopedia Definition, Retrieved from Internet URL : https://www.webopedia.com/TERM/P/polyline.html, accessed on Feb. 21, 2019, pp. 4.
"What are deconvolutional layers?", Data Science Stack Exchange, Retrieved from Internet URL : https://datascience.stackexchange.com/questions/6107/what%E2%80%90are%E2%80%90deconvolutional%E2%80%90layers, accessed on Feb. 21, 2019, pp. 21.
Allison, R. S., et al., "Binocular depth discrimination and estimation beyond interaction space", Journal of Vision, vol. 9, No. 1, pp. 1-14 (Jan. 2009).
Alvarez, J. M., et al., "Road Scene Segmentation from a Single Image", In Proceedings of the 12th European Conference on Computer Vision—vol. Part VII, ECCV'12, pp. 376-389 (2012).
Asvadi, A., et al., "DepthCN: Vehicle detection using 3D-LIDAR and ConvNet", IEEE 20th International Conference on Intelligent Transportation Systems (ITSC), pp. 1-6 (2017).
Bach, M., et al., "Multi-Camera Traffic Light Recognition Using A Classifying Labelled Multi-Bernoulli Filter", In 2017 IEEE Intelligent Vehicles Symposium (IV), pp. 1045-1051 (Jun. 11-14, 2017).
Badino, H., et al., "Free Space Computation Using Stochastic Occupancy Grids and Dynamic Programming", Worshop on Dynamical Vision at ICCV, pp. 1-12 (Oct. 2007).
Badino, H., et al., "The Stixel World—A Compact Medium Level Representation of the 3d-World", In DAGM, pp. 1-10 (2009).
Benenson, R., et al., "Stixels Estimation Without Depth Map Computation", In ICCV, pp. 1-8 (2011).
Bidlack, C. et al., "Visual Robot Navigation Using Flat Earth Obstacle Projection", Proceedings of the IEEE International Conference on Robotics and Automation, pp. 3374-3381 (May 8, 1994).
Bojarski, M., et al., "End To End Learning For Self-Driving Cars", arXiv: 1604.07316v1 [cs.CV], XP055570062, Retrieved from the Internet URL:https://nvidia.com/content/tegra/automotive/images/2016/solutions/pdf/end-to-end-dl-using-px.pdf, pp. 1-9 (Apr. 25, 2016).
Borland, D., and Taylor II, R. M.,"Rainbow Color Map (Still) Considered Harmful", IEEE Computer Graphics and Applications, vol. 27, No. 2, pp. 1-17 (Mar./Apr. 2007).
Brust, C. A., et al., "Convolutional Patch Networks With Spatial Prior For Road Detection and Urban Scene Understanding", In International Conference on Computer Vision Theory and Applications (VISAPP), arXiv:1 1502.06344v1 [cs.CV], pp. 1-9 (Feb. 23, 2015).
Chen, B., et al., "Angular Visual Hardness", arXivpreprint arXiv:1912.02279, pp. 1-27 (2019).
Chen, J., et al., "FOAD: Fast Optimization-based Autonomous Driving Motion Planner", 2018 Annual American Control Conference (ACC), IEEE, pp. 1-8 (Jun. 27-29, 2018).
Cheng, G., et al., "Automatic Road Detection and Centerline Extraction via Cascaded End-to-End Convolutional Neural Network", IEEE Transactions on Geoscience and Remote Sensing vol. 55, No. 6, pp. 3322-3337 (Jun. 1, 2017).
Chilamkurthy, S., "A 2017 Guide to Semantic Segmentation with Deep Learning", Qure.ai Blog, Retrieved from Internet URL : http://blog.qure.ai/notes/semantic-segmentation-deep-learning-review, accessed on Feb. 21, 2019, pp. 16 (Jul. 5, 2017).
Clevert, D.-A., et al., "Fast and Accurate Deep Network Learning by Exponential Linear Units (ELUs)", ICLR 2016, pp. 1-14 (Feb. 22, 2016).

(56) References Cited

OTHER PUBLICATIONS

Cormack, R. H., "Stereoscopic depth perception at far viewing distances", Perception & Psychophysics, vol. 35, No. 5, pp. 423-428 (Sep. 1984).
Deshpande, A., "A Beginner's Guide to Understanding Convolutional Neural Networks", accessed at: https://adeshpande3.github.io/A-Beginner's-Guide-To-Understanding-Convolutional-Neural-Networks/, Accessed on Feb. 21, 2019, pp. 1-13.
Mendes, C.C.T., et al., "Exploiting Fully Convolutional Neural Networks For Fast Road Detection", Proceedings of IEEE, International Conference on Robotics and Automation (ICRA), pp. 1-6 (May 2016).
Mikić, I. et al., "Human Body Model Acquisition and Tracking Using Voxel Data", International Journal of Computer Vision, vol. 53, No. 3, pp. 199-223 (2003).
Mohan, R., "Deep Deconvolutional Networks For Scene Parsing", arXiv:1411.4101v1 [stat.ML], pp. 1-8 (Nov. 15, 2014).
Molchanov, P., "Pruning Convolutional Neural Networks for Resource Efficient Inference", Published as a conference paper at ICLR 2017, arXiv: 1611.06440v2 [cs.LG], pp. 1-17 (Jun. 8, 2017).
Neven, D., et al., "Towards End-to-End Lane Detection: an Instance Segmentation Approach", arXiv:1802.05591v1 [cs.CV], pp. 1-7 (Feb. 15, 2018) XP055590532, Retrieved from the Internet: URL:https://arxiv.org/pdf/1802.05591.pdf.
Oliveira, G. L., "Efficient Deep Models for Monocular Road Segmentation", IEEE/ RSJ International Conference on Intelligent Robots and Systems (IROS), pp. 1-7 (2016).
Park, J. J., et al., "DeepSDF: Learning Continuous Signed Distance Functions for Shape Representation", Proceedings of the IEEE/CVF Conference on Computer Vision and Pattern Recognition (CVPR), pp. 165-174 (2019).
Park, S., et al., "Few-Shot Adaptive Gaze Estimation", arXiv:1905.01941v2, pp. 1-13 (Oct. 14, 2019).
Palmisano, S., et al., "Stereoscopic perception of real depths at large distances", Journal of Vision, vol. 10, No. 6, pp. 1-16 (Jun. 2010).
Pang, J., et al., "Cascade Residual Learning: A Two-Stage Convolutional Neural Network for Stereo Matching", IEEE International Conference on Computer Vision Workshops (ICCVW), pp. 887-895 (Oct. 22, 2017).
Rothe, R., et al., "Non-Maximum Suppression For Object Detection By Passing Messages Between Windows", In Asian Conference on Computer Vision, pp. 1-17 (2015).
Seki, A., and Pollefeys, M., "Patch Based Confidence Prediction for Dense Disparity Map", British Machine Vision Conference, pp. 1-13 (2016).
Seki, A., and Pollefeys, M., "SGM-Nets: Semi-Global Matching with Neural Networks", IEEE Conference on Computer Vision and Pattern Recognition, pp. 231-240 (2017).
Shaked, A., and Wolf, L., "Improved Stereo Matching With Constant Highway Networks and Reflective Confidence Learning", IEEE Conference on Computer Vision and Pattern Recognition, pp. 1-13 (2016).
Stein, G. P., et al.,"Vision-Based ACC With a Single Camera: Bounds on Range and Range Rate Accuracy", Proceedings of IEEE Intelligent Vehicle Symposium, pp. 1-6 (2003).
Suorsa, R. E., et al.,"A Parallel Implementation of a Multisensor Feature-Based Range-Estimation Method", IEEE Transactions on Robotics and Automation, vol. 10, Issue 6, pp. 1-34 (1994).
Szegedy, C., et al.,"Going Deeper with Convolutions", arXiv:1409.4842v1 [cs.CV], Available at: https://arxiv.org/abs/1409.4842, pp. 1-12 (Sep. 17, 2014).
Tao, A., et al., "Detectnet: Deep Neural Network For Object Detection In Digits", accessed at : https://devblogs.nvidia.com/detectnet-deep-neural-network-object-detection-digits/, Accessed on Jul. 22, 2019 , pp. 1-9.
Tateno, K. et al., "CNN-SLAM: Real-time dense monocular SLAM with learned depth prediction", pp. 6243-6252 (2017).
Teichmann, M., et al., "Multinet: Real-Time Joint Semantic Reasoning For Autonomous Driving", arXiv:1612,.07695v2 [cs.CV], pp. 1-10 (May 8, 2018).
Thrun, S., et al., "Probabilistic Robotics: Intelligent Robotics and Autonomous Agents," The MIT Dress, pp. 1-180 (2005).
Virgo, M., "Lane Detection with Deep Learning (Part 1)", Accessed on Feb. 22, 2019 at: https://towardsdatascience.com/lane-detection-with-deep-learning-part-1-9e096f3320b7, pp. 1-10 (May 9, 2017).
Wang, Z., "Image quality assessment: from error visibility to structural similarity", IEEE Transactions on Image Processing, vol. 13, No. 4, pp. 1-14, (Apr. 2004).
Weber, M., et al., "Deeptlr: A Single Deep Convolutional Network For Detection and Classification of Traffic Lights", In IEEE Intelligent Vehicles Symposium (IV), pp. 1-7 (Jun. 2016).
Wu, J., et al., "Automatic background filtering and lane identification with roadside LiDAR data", 2017 IEEE 20th International Conference on Intelligent Transportation Systems (ITSC), pp. 1-6 (2017).
Xie, S., and Tu, Z., "Holistically -Nested Edge Detection", Computer Vision Foundation, pp. 1395-1403 (2015).
Yang, T-Y., et al., "FSA-Net: Learning Fine-Grained Structure Aggregation for Head Pose Estimation from a Single Image", In Proceedings of the IEEE Conference on Computer Vision and Pattern Recognition, pp. 1-9 (2019).
Yang, Z., "Research on Lane Recognition Algorithm Based on Deep Learning", International Conference on Artificial Intelligence and Advanced Manufacturing (AIAM), IEEE, pp. 387-391 (2019).
Yao, J., et al., "Estimating Drivable Collision-Free Space From Monocular Video," IEEE Winter Conference on Applications of Computer Vision (WACV), pp. 1-10 (2015).
Zbontar, J., and Lecun, Y., "Stereo Matching by Training a Convolutional Neural Network to Compare Image Patches", Journal of Machine Learning Research, vol. 17, pp. 1-32 (2016).
Zhao, H., et al., "Loss Functions for Image Restoration With Neural Networks", IEEE Transactions on Computational Imaging, vol. 3, No. 1, pp. 1-11 (Mar. 2017).
Zhong, Y., et al., "Self-Supervised Learning for Stereo Matching With Self-Improving Ability", arXiv:1709.00930v1 [cs.CV], pp. 1-13 (Sep. 4, 2017).
Zhu, M., et al., "Robust Facial Landmark Detection via Occlusion-adaptive Deep Networks", In Proceedings of the IEEE Conference on Computer Vision and Pattern Recognition, pp. 1-10 (2019).
Zhu, X., et al., "Face Alignment in Full Pose Range: A 3D Total Solution", IEEE Transactions on Pattern Analysis and Machine Intelligence, vol. 41, No. 1, pp. 1-14 (2017).
Invitation to pay additional fees received for PCT Application No. PCT/US2019/018348, dated May 29, 2019, 18 pages.
Invitation to pay additional fees received for PCT Application No. PCT/US2019/019656, mailed May 31, 2019, 9 pages.
International Search Report and Written Opinion dated Jun. 26, 2019 in International Application No. PCT/US2019/024400, 11 pages.
Invitation to pay additional fees received for PCT Application No. PCT/US2019/022592, mailed on Jun. 26, 2019, 9 pages.
International Search Report and Written Opinion received for PCT Patent Application No. PCT/US2019/019656, dated Jul. 24, 2019, 14 pages.
International Search Report and Written Opinion received for PCT Patent Application No. PCT/US2019/018348, dated Jul. 25, 2019, 21 pages.
International Search Report and Written Opinion received for PCT Patent Application No. PCT/US2019/022592, dated Aug. 26, 2019, 14 pages.
International Search Report and Written Opinion dated Oct. 18, 2019 in International Patent Application No. PCT/US2019/042225, 11 pages.
International Search Report and Written Opinion dated Nov. 7, 2019 in International Patent Application No. PCT/US2019/022753, 18 Pages.
International Search Report and Written Opinion received for PCT Patent Application No. PCT/US2019/068764, dated Apr. 22, 2020, 15 pages.
International Search Report and Written Opinion received for PCT Patent Application No. PCT/US2019/068766, dated Apr. 22, 2020, 13 pages.

(56) References Cited

OTHER PUBLICATIONS

Invitation to pay additional fees received for PCT Application No. PCT/US2020/028116, mailed on Jul. 21, 2020, 12 pages.
International Search Report and Written Opinion in International Patent Application No. PCT /US2020/021894 dated Aug. 3, 2020, 14 pages.
International Preliminary Report on Patentability received for PCT Application No. PCT/US2019/018348, dated Aug. 27, 2020, 16 pages.
International Preliminary Report on Patentability received for PCT Application No. PCT/US2019/019656, dated Sep. 3, 2020, 11 pages.
International Search Report and Written Opinion received for PCT Patent Application No. PCT/US2020/028116, dated Sep. 11, 2020, 17 pages.
International Preliminary Report on Patentability received for PCT Application No. PCT/US2019/022592, mailed on Sep. 24, 2020, 11 pages.
International Preliminary Report on Patentability received for PCT Application No. PCT/US2019/022753, mailed on Oct. 1, 2020, 14 pages.
International Preliminary Report on Patentability received for PCT Application No. PCT/US2019/024400, mailed on Oct. 8, 2020, 10 pages.
International Search Report and Written Opinion received for PCT Patent Application No. PCT/US2020/039430, mailed on Oct. 9, 2020, 13 pages.
Non-Final Office Action dated Nov. 25, 2020, in U.S. Appl. No. 16/356,439, 22 pages.
Notice of Allowance dated Dec. 24, 2020, in U.S. Appl. No. 16/385,921, 18 pages.
Notice of Allowance dated Jan. 4, 2021, in U.S. Appl. No. 16/535,440, 10 pages.
Notice of Allowance dated Jan. 19, 2021 in U.S. Appl. No. 16/286,329, 8 pages.
Preinterview First Office Action dated Jan. 26, 2021 in U.S. Appl. No. 16/355,328, 5 pages.
International Preliminary Report on Patentability received for PCT Patent Application No. PCT/US2019/042225, mailed on Jan. 28, 2021, 9 pages.
Non-Final Office Action dated Jan. 29, 2021 in U.S. Appl. No. 16/544,442, 08 pages.
Non-Final Office Action dated Feb. 24, 2021 in U.S. Appl. No. 16/363,648, 13 pages.
First Action Interview Office Action dated Mar. 1, 2021 in U.S. Appl. No. 16/355,328, 4 pages.
International Search Report and Written Opinion received for PCT Patent Application No. PCT/US2020/062869, mailed on Mar. 17, 2021, 11 pages.
Notice of Allowance dated Mar. 26, 2021, in U.S. Appl. No. 16/356,439, 11 pages.
International Search Report and Written Opinion received for PCT Patent Application No. PCT/US2021/029411, mailed on Apr. 11, 2021, 16 pages.
Non-Final Office Action dated May 13, 2021 in U.S. Appl. No. 16/728,595, 18 pages.
Notice of Allowance dated Jun. 11, 2021 in U.S. Appl. No. 16/544,442, 8 pages.
Notice of Allowance dated Jul. 16, 2021 in U.S. Appl. No. 16/728,598, 9 pages.
Notice of Allowance dated Jul. 2, 2021 in U.S. Appl. No. 16/813,306, 13 pages.
International Preliminary Report on Patentability received for PCT Application No. PCT/US2019/068764, mailed on Jul. 8, 2021, 12 pages.
International Preliminary Report on Patentability received for PCT Application No. PCT/US2019/068766, mailed on Jul. 8, 2021, 10 pages.
Non-Final Office Action dated Aug. 18, 2021 in U.S. Appl. No. 17/004,252, 09 pages.
Notice of Allowance dated Aug. 19, 2021 in U.S. Appl. No. 16/907,125, 09 pages.
Notice of Allowance dated Aug. 31, 2021 in U.S. Appl. No. 16/728,595, 8 pages.
Final Office Action dated Sep. 9, 2021 in U.S. Appl. No. 16/363,648, 11 pages.
Invitation to Pay Additional Fees received for PCT Application No. PCT/US2021/029411, mailed on Sep. 13, 2021, 11 pages.
International Preliminary Report on Patentability received for PCT Application No. PCT /US2020/021894, dated Sep. 23, 2021, 11 pages.
Notice of Allowance dated Oct. 7, 2021 in U.S. Appl. No. 16/813,306, 9 pages.
International Preliminary Report on Patentability received for PCT Application No. PCT/US2020/028116, mailed on Nov. 4, 2021, 14 pages.
Notice of Allowance dated Dec. 14, 2021 in U.S. Appl. No. 16/728,595, 8 pages.
Final Office Action dated Dec. 17, 2021 in U.S. Appl. No. 16/355,328, 17 pages.
Non-Final Office Action dated Jan. 5, 2022 in U.S. Appl. No. 16/363,648, 15 pages.
International Preliminary Report on Patentability received for PCT Application No. PCT/US2020/039430, mailed on Jan. 6, 2022, 12 pages.
Notice of Allowance dated Jan. 13, 2022 in U.S. Appl. No. 17/004,252, 09 pages.
Preinterview First Office Action dated Feb. 22, 2022 in U.S. Appl. No. 16/911,007, 2 pages.
Non Final Office Action dated Mar. 1, 2022 in U.S. Appl. No. 17/010,205, 14 pages.
Notice of Allowance dated Mar. 4, 2022, in U.S. Appl. No. 16/355,328, 5 pages.
Notice of Allowance dated Apr. 4, 2022, in U.S. Appl. No. 17/004,252, 09 pages.
Notice of Allowance dated Apr. 20, 2022, in U.S. Appl. No. 16/355,328, 5 pages.
Notice of Allowance dated May 11, 2022 in U.S. Appl. No. 16/911,007, 9 pages.
Final Office Action dated May 23, 2022 in U.S. Appl. No. 16/363,648, 17 pages.
Notice of Allowance dated Jun. 8, 2022 in U.S. Appl. No. 17/004,252, 9 pages.
Murat Arar, Nuri; First Office Action for Chinese Patent Application No. 202111221654.3, filed Oct. 20, 2021, mailed Dec. 13, 2023, 14 pgs.

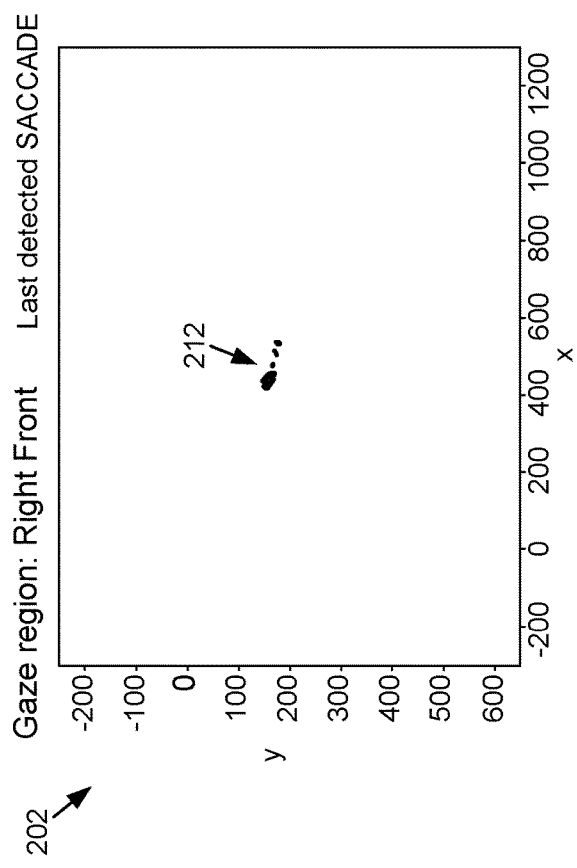
FIGURE 2A
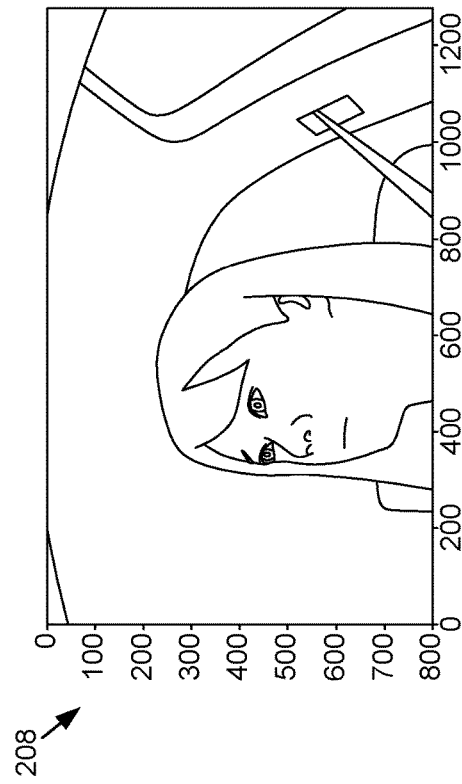
FIGURE 2C
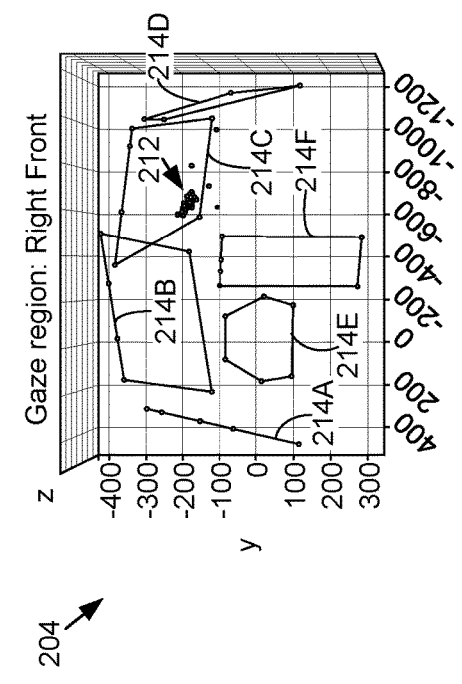
FIGURE 2D
FIGURE 2B

OCCUPANT ATTENTIVENESS AND COGNITIVE LOAD MONITORING FOR AUTONOMOUS AND SEMI-AUTONOMOUS DRIVING APPLICATIONS

CROSS-REFERENCE TO RELATED APPLICATIONS

This application is related to U.S. Non-Provisional application Ser. No. 16/286,329, filed on Feb. 26, 2019, U.S. Non-Provisional application Ser. No. 16/355,328, filed on Mar. 15, 2019, U.S. Non-Provisional application Ser. No. 16/356,439, filed on Mar. 18, 2019, U.S. Non-Provisional application Ser. No. 16/385,921, filed on Apr. 16, 2019, U.S. Non-Provisional application Ser. No. 16/514,230, filed on Jul. 17, 2019, U.S. Non-Provisional Application No. 535,440, filed on Aug. 8, 2019, U.S. Non-Provisional application Ser. No. 16/728,595, filed on Dec. 27, 2019, U.S. Non-Provisional application Ser. No. 16/728,598, filed on Dec. 27, 2019, U.S. Non-Provisional application Ser. No. 16/813,306, filed on Mar. 9, 2020, U.S. Non-Provisional application Ser. No. 16/814,351, filed on Mar. 10, 2020, U.S. Non-Provisional application Ser. No. 16/848,102, filed on Apr. 14, 2020, U.S. Non-Provisional application Ser. No. 16/911,007, filed on Jun. 24, 2020, and U.S. Non-Provisional application Ser. No. 16/915,577, filed on Jun. 29, 2020, U.S. Non-Provisional application Ser. No. 16/363,648, filed on Oct. 8, 2018, U.S. Non-Provisional application Ser. No. 16/544,442, filed on Aug. 19, 2019, U.S. Non-Provisional application Ser. No. 17/010,205, filed on Sep. 2, 2020, U.S. Non-Provisional application Ser. No. 16/859,741, filed on Apr. 27, 2020, U.S. Non-Provisional application Ser. No. 17/004,252, filed on Aug. 27, 2020, and/or U.S. Non-Provisional application Ser. No. 17/005,914, filed on Aug. 28, 2020, and U.S. Non-Provisional application Ser. No. 16/907,125, filed on Jun. 19, 2020, each of which is incorporated by reference herein in its entirety.

BACKGROUND

Cognitive and visual attentiveness play an important role in the ability of a driver to detect safety critical events and, as a result, to safely control a vehicle. For example, where a driver is distracted—e.g., due to daydreaming, distractions, using mental capacity for tasks other than the current driving task, observing off-road activity, etc.—the driver may not make proper planning and control decisions, or the correct decisions may be delayed. To account for this, some vehicle systems—such as advanced driver assistance systems (ADAS)—are used to generate audible, visual, and/or tactile warnings or alerts for drivers to notify the driver of environmental and/or road conditions (e.g., vulnerable road users (VRUs), traffic lights, heavy traffic, potential collisions, etc.). However, as the number of warning systems increases (e.g., automatic emergency braking (AEB), blind spot detection (BSD), forward collision warning (FCW), etc.) the number of alerts or warnings generated may become overwhelming for the driver. As a result, a driver may turn off the safety system functionality for one or more of these systems, thereby eliminating the effectiveness of these systems at mitigating unsafe events from occurring.

In some conventional systems, driver monitoring systems and/or driver drowsiness detection systems may be used to determine the current state of the driver. However, these conventional systems measure cognitive load or driver attentiveness separate from one another. For example, once a state of the driver is determined, the driver may be warned or alerted as to their determined inattentiveness or increased cognitive load. Not only does this result in a warning or alert in addition to the already existing warning alerts of other ADAS systems, the determinations of attentiveness or high cognitive load may be inaccurate or imprecise. For example, with respect to attentiveness, gaze of a user may be measured within the vehicle—e.g., where the user is gazing within the vehicle cabin. However, a driver determined to be attentive because their gaze is toward the front windshield may not actually be attentive because outside environmental conditions—e.g., locations of static or dynamic objects, road conditions, wait conditions, etc.—are not taken into account. With respect to cognitive load, conventional systems employ deep neural networks (DNNs) trained on simulated data that links pupil size or other eye characteristics, eye movements, blink rate or other eye measurements, and/or other information to a current cognitive load. However, these measures are subjective and may be inaccurate or imprecise for certain users—e.g., cognitive load may manifest differently for different drivers and/or some drivers may perform better than others when under a high cognitive load. As such, using driver inattentiveness or cognitive load independent of one another, and ignoring environmental conditions outside of the vehicle, may result in excessive warnings and alerts generated based on inaccurate, unreliable, or piecemeal information of a current state of a driver.

SUMMARY

Embodiments of the present disclosure relate to occupant attentiveness and cognitive load monitoring for semi-autonomous or autonomous driving applications. Systems and methods are disclosed that, in addition to monitoring for attentiveness and/or cognitive load, compare estimated field of view or gaze information of a user to vehicle perception information corresponding to an environment outside of the vehicle. As a result, interior monitoring of a driver or occupant of the vehicle may be extended to an exterior of the vehicle to determine whether the driver or occupant has processed or seen certain object types, environmental conditions, or other information exterior to the vehicle—e.g., dynamic actors, static objects, vulnerable road users (VRUs), wait condition information, signs, potholes, bumps, debris, etc. Where a projected—e.g., into a world space coordinate system—representation of a field of view or gaze of a user is determined to overlap with a detected object, condition, and/or the like, the system may presume the user has seen the object, condition, etc., and may refrain from executing an action (e.g., generating a notification, activating an AEB system, etc.).

In some embodiments, for a more holistic understanding of the state of the user—e.g., corresponding to a current ability of the user to process seen or visualized information—attentiveness and/or cognitive load of the user may be monitored to determine whether one or more actions should be taken (e.g., to generate a visual, audible, tactile, or other notification type, to take over control of the vehicle, to active one or more AEB systems, etc.). As such, even where it may be determined that the object, road condition, etc. has entered the user's field of view, an action may be executed corresponding to the object, road condition, and/or the like where a determined attentiveness and/or cognitive load of the user indicate that the user may not have fully processed the information to make an informed driving decision absent the action. As a result, and in contrast to conventional systems, notifications, AEB system activations, and/or other actions may be determined based on a more objective and complete state of the user as determined based on cognitive load, attentiveness, and/or a comparison between external perception of the vehicle and estimated perception of the user as projected externally of the vehicle. In addition, by using more objective measures of attentiveness and/or cognitive load, simulations of real-world scenarios—e.g., in a virtual simulated environment—may be more accurate and reliable, and thus more suitable for designing, testing, and ultimately deploying in a real-world system.

BRIEF DESCRIPTION OF THE DRAWINGS

The present systems and methods for occupant attentiveness and cognitive load monitoring for semi-autonomous or autonomous driving applications are described in detail below with reference to the attached drawing figures, wherein:

FIG. 2A depicts an example plot generated using eye movement information, in accordance with some embodiments of the present disclosure;

FIG. 2B depicts an example plot including vehicle region visualizations generated using eye movement information, in accordance with some embodiments of the present disclosure;

FIG. 2C-2D depict example illustrations of eye locations at a time step or frame used for determining eye movement information, in accordance with some embodiments of the present disclosure;

DETAILED DESCRIPTION

Systems and methods are disclosed related to occupant attentiveness and cognitive load monitoring for semi-autonomous or autonomous driving applications. Although the present disclosure may be described with respect to an example autonomous vehicle 500 (alternatively referred to herein as "vehicle 500" or "ego-vehicle 500," an example of which is described herein with respect to FIGS. 5A-5D), this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to autonomous driving, this is not intended to be limiting. For example, the systems and methods described herein may be used in robotics, aerial systems (e.g., to determine attentiveness and/or cognitive load), boating systems, simulation environments (e.g., for simulating actions based on attentiveness and/or cognitive load of a human operator of virtual vehicles within a virtual simulation environment), and/or other technology areas.

Figure 1:
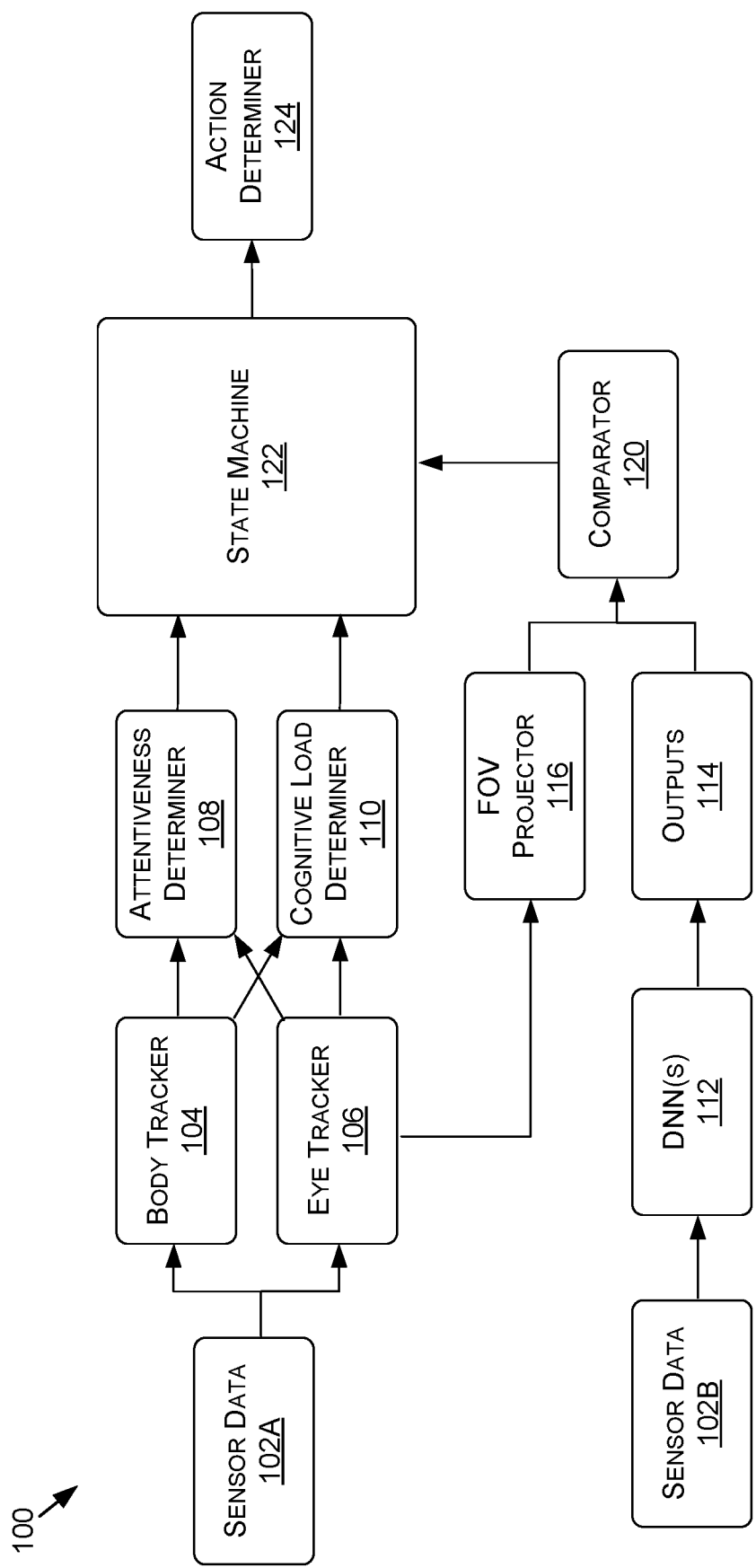
FIG. 1 depicts a data flow diagram for a process of attentiveness and/or cognitive load monitoring, in accordance with some embodiments of the present disclosure.

With reference to FIG. 1, FIG. 1 depicts a data flow diagram for a process 100 of attentiveness and/or cognitive load monitoring, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, software, and/or any combination thereof. For instance, various functions may be carried out by a processor executing instructions stored in memory.

The process 100 may include generating and/or receiving sensor data 102A and/or 102B (referred to collectively herein as "sensor data 102") from one or more sensors of a vehicle 500 (which may be similar to the vehicle 500, or may include non-autonomous or semi-autonomous vehicles). The sensor data 102 may be used within the process 100 for tracking body movements or posture of one or more occupants of the vehicle 500, tracking eye movements of an occupant(s) of the vehicle 500, determining attentiveness and/or cognitive load of an occupant(s), projecting a representation of a gaze or field of view of an occupant(s) exterior of the vehicle 500, generating outputs 114 using one or more deep neural networks (DNNs) 112, comparing the field of view or gaze representation to the outputs 114, determining a state of an occupant(s), determining one or more actions to take based on the state, and/or other tasks or operations. The sensor data 102 may include, without limitation, sensor data 102 from any type of sensors, such as but not limited to those described herein with respect to the vehicle 500 and/or other vehicles or objects—such as robotic devices, VR systems, AR systems, etc., in some examples. For non-limiting example, and with reference to FIGS. 5A-5C, the sensor data 102 may include the data generated by, without limitation, global navigation satellite systems (GNSS) sensor(s) 558 (e.g., global positioning system (GPS) sensor(s), differential GPS (DGPS) sensor(s), etc.), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, in-cabin cameras, in-cabin heat, pressure, or touch sensors, in-cabin motion sensors, in-cabin microphones, speed sensor(s) 544 (e.g., for measuring the speed of the vehicle 500 and/or distance traveled), and/or other sensor types.

In some embodiments, the sensor data 102A may correspond to sensor data generated using one or more in-cabin sensors, such as one or more in-cabin cameras, in-cabin near-infrared (NIR) sensors, in-cabin microphones, and/or the like, and the sensor data 102B may correspond to sensor data generated using one or more external sensors of the vehicle 500, such as one or more cameras, RADAR sensor(s) 560, ultrasonic sensor(s) 562, LIDAR sensor(s) 564, and/or the like. As such, the sensor data 102A may correspond to sensors with a sensory field or field of view internal to the vehicle 500 (e.g., cameras with the occupant(s), such as the driver, in its field of view) and the sensor data 102B may correspond to sensors with a sensory field or field of view external to the vehicle 500 (e.g., cameras, LiDAR sensors, etc. with sensory fields including the environment exterior to the vehicle 500). However, in some embodiments, the sensor data 102A and the sensor data 102B may include sensor data from any sensors with sensory fields internal and/or external to the vehicle 500.

The sensor data 102A may be used by a body tracker 104 and/or an eye tracker 106 to determine gestures, postures, activities, eye movements (e.g., saccade velocity, smooth pursuits, gaze locations, directions, or vectors, pupil size, blink rate, road scan range and distribution, etc.), and/or other information about an occupant—e.g., a driver—of the vehicle 500. This information may then be used by an attentiveness determiner 108 to determine an attentiveness of an occupant(s), a cognitive load determiner 110 to determine a cognitive load of the occupant(s), and/or a field of view (FOV) projector 116 to compare—via a comparator 120—with external perception outputs 114 from one or more deep neural networks (DNNs) 112. Information representative of the attentiveness, cognitive load, and/or the outputs of the comparator 120 may be analyzed by a state machine 122 to determine a state of the occupant(s), and the state may be used by an action determiner 124 to determine one or more actions or operations to execute (e.g., to issue a visual, audible, and/or tactile notification, suppress a notification, engage an ADAS system, take over autonomous control of the vehicle 500, etc.).

The body tracker 104 may use the sensor data 102A—e.g., sensor data from one or more in-cabin cameras, microphones, pressure sensors, temperature sensors, etc.—to determine a posture, pose, activity or state (e.g., two hands on wheel, one hand on wheel, texting, reading, slouching, sudden sickness, incapacitated, distracted, etc.), and/or other information about an occupant(s). For example, the body tracker 104 may execute one or more machine learning algorithms, deep neural networks, computer vison algorithms, image processing algorithms, mathematical algorithms, and/or the like to determine the body tracking information. In some non-limiting embodiments, the body tracker 104 may include similar features, functionality, and/or components as described in U.S. Non-Provisional application Ser. No. 16/915,577, filed on Jun. 29, 2020 and/or U.S. Non-Provisional application Ser. No. 16/907, 125, filed on Jun. 19, 2020, each of which is incorporated by reference herein in its entirety.

The eye tracker 106 may use the sensor data 102A—e.g., sensor data from one or more in-cabin cameras, NIR cameras or sensors, and/or other eye-tracking sensor types—to determine gaze directions and movements, fixations, road scanning behaviors (e.g., road scanning patterns, distribution, and range), saccade information (e.g., velocity, direction, etc.), blink rate, smooth pursuit information (e.g., velocity, direction, etc.), and/or other information. The eye tracker 106 may determine time periods corresponding to certain states, such as how long a fixation lasts, and/or may track how many times certain states are determined—e.g., how many fixations, how many saccades, how many smooth pursuits, etc. The eye tracker 106 may monitor or analyze each eye individually, and/or may monitor or analyze both eyes together. For example, both eyes may be monitored in order to use triangulation for measuring a depth of an occupant's gaze. In some embodiments, the eye tracker 106 may execute one or more machine learning algorithms, deep neural networks, computer vison algorithms, image processing algorithms, mathematical algorithms, and/or the like to determine the eye tracking information. In some non-limiting embodiments, the eye tracker 106 may include similar features, functionality, and/or components as described in U.S. Non-Provisional application Ser. No. 16/363,648, filed on Oct. 8, 2018, U.S. Non-Provisional application Ser. No. 16/544,442, filed on Aug. 19, 2019, U.S. Non-Provisional application Ser. No. 17/010,205, filed on Sep. 2, 2020, U.S. Non-Provisional application Ser. No. 16/859,741, filed on Apr. 27, 2020, U.S. Non-Provisional application Ser. No. 17/004,252, filed on Aug. 27, 2020, and/or U.S. Non-Provisional application Ser. No. 17/005,914, filed on Aug. 28, 2020, each of which is incorporated by reference herein in its entirety.

The attentiveness determiner 108 may be used to determine the attentiveness of the occupant(s). For example, the outputs from the body tracker 104 and/or the eye tracker 106 may be processed or analyzed by the attentiveness determiner 108 to generate an attentiveness value, score, or level. The attentiveness determiner 108 may execute one or more machine learning algorithms, deep neural networks, computer vison algorithms, image processing algorithms, mathematical algorithms, and/or the like to determine the attentiveness. For example, with respect to FIGS. 2A-2E, FIG. 2A includes a graph 202 corresponding to a current (e.g., corresponding to a current time or a period of time—such as a second, three seconds, five seconds, etc.) gaze direction and gaze information. For example, the gaze direction may be represented by points 212, where the (x, y) locations in the graph 202 may have corresponding locations with respect to the vehicle 500. The graph 202 may be used to determine eye movement types—e.g., a most recent eye movement type—such as a saccade, as referenced in FIG. 2A, or a smooth pursuit, fixation, etc. As a further example, with respect to FIG. 2B, the points 212 from the graph 202 may be reflected in graph 204, which may reflect current and/or recent (e.g., within last second, three seconds, etc.) gaze regions of the occupant(s). For example, any number of gaze regions 214 (e.g., gaze regions 214A-214F) may be used to determine road scanning behaviors, fixations, and/or other information that may be used by the attentiveness determiner 108. As non-limiting examples, the gaze regions 214 may include a left side gaze region 214A (e.g., corresponding to a driver side window, a driver side mirror, etc.), a left front gaze region 214B (e.g., corresponding to a left half or portion of a front windshield), a right front gaze region 214C (e.g., corresponding to a right half or portion of a front windshield), a right side gaze region 214D (e.g., corresponding to a passenger side window, a passenger side mirror, etc.), an instrument cluster gaze region 214E (e.g., corresponding to an instrument cluster 532 or instrument panel behind, below, and/or above the steering wheel), and/or a center console gaze region 214F (e.g., corresponding to control-bearing surfaces, displays, touch screen interfaces, radio controls, air conditioning controls, hazard light controls, in-vehicle infotainment (IVI), in-car entertainment (ICE), and/or other center console features).

Figure 2E:
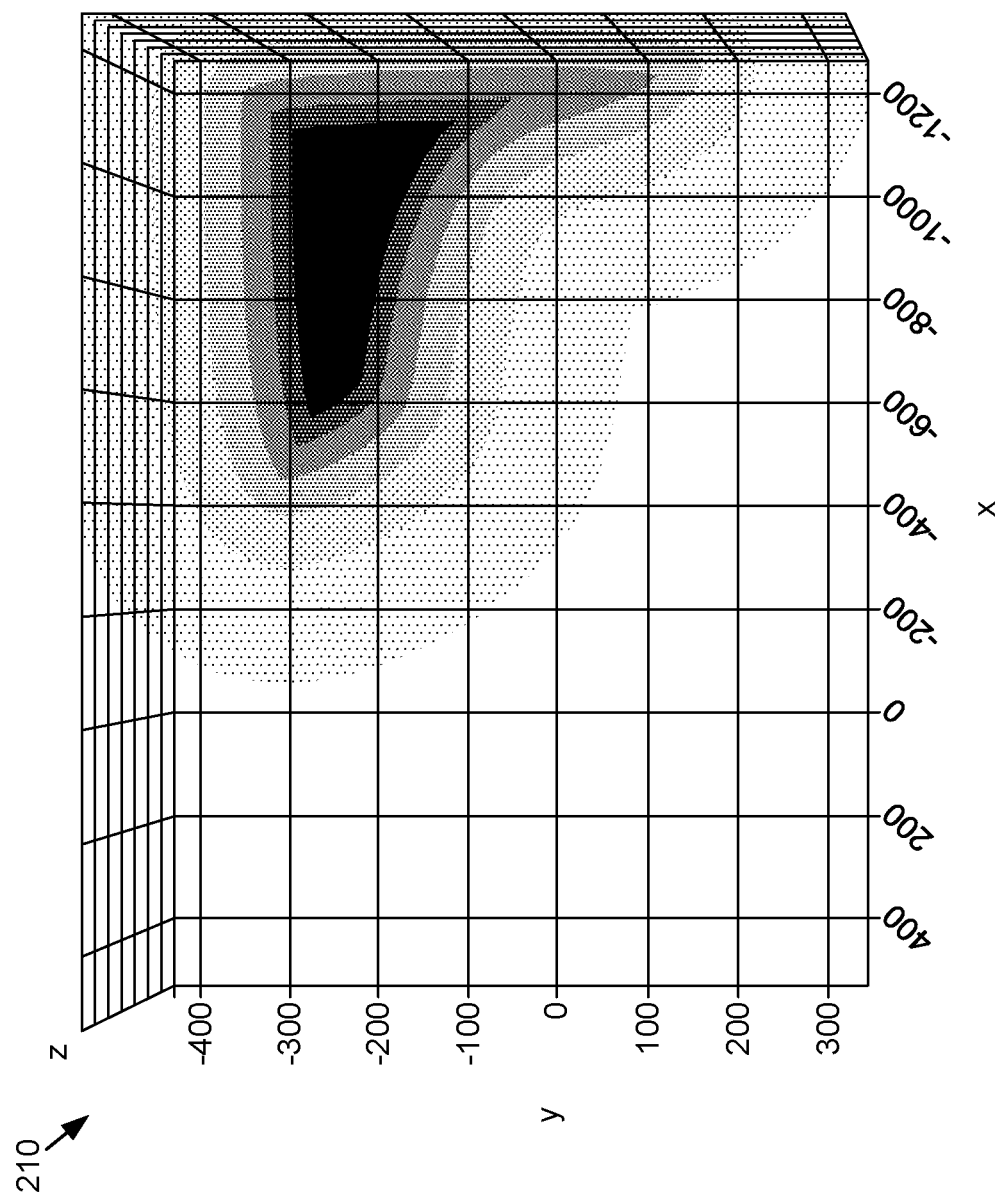
FIG. 2E depicts an example heat map corresponding to eye movement information gathered over a period of time, in accordance with some embodiments of the present disclosure.

With respect to FIGS. 2C-2D, charts 206 and 208 include visualizations of an occupant—e.g., more focused on eyes of the occupant in the chart 206 and more broadly focused on the occupant in the chart 208—that may be used to generate the chart 202, 204, and/or 210. For example, the determination that the occupant is looking toward the right front of the vehicle 500—e.g., toward the right front gaze region 214C—and that the last movement of the occupant was a saccade may be determined using one or more instances of the charts 206 and 208. The (x, y) location of the head and/or eyes of the occupant may have a known correlation to a gaze region 214 and/or to an (x, y) location of a gaze region chart—such as the charts 202 and/or 204. As such, an orientation of a head and/or eyes of the occupant may be determined and used to determine a gaze direction and/or location for a current frame. In addition, the results over any number of frames (e.g., for two seconds of frames captures at 30 frames per second, or 60 frames) may be used to track movement types—such as saccades, blink rate, smooth pursuits, fixations, road scanning behaviors, and/or the like. In some embodiments, as illustrated in FIG. 2E, the gaze information of the occupant may be tracked over some period of time and used to generate a heat map 210 (e.g., with darker regions corresponding to more frequent gaze locations or directions than regions that are lighter or have less dense patterns of points) corresponding to gaze locations and directions of the occupant over time (e.g., over a thirty second period, one minute, three minutes, five minutes, etc.). For example, with respect to the heat map 210—where the coordinate system is similar to that of the chart 202 and/or 204—the heat map 210 may indicate that the occupant has more frequently gazed toward the right front gaze region 214C and/or the right side gaze region 214D than other gaze regions 214. In some embodiments, the heat map 210 may be updated at each frame to include the information of the current frame. For example, weighting may be applied to give more weight to more recent gaze information when generating the heat map 210. The heat map 210 may then represent the occupant's road scanning behaviors, patterns, and/or frequency, which may be used to determine attentiveness of the occupant(s).

The attentiveness determiner 108 may then use some or all of the eye tracking information to determine the attentiveness of the occupant(s). For example, where the heat map indicates that the occupant has been scanning the road frequently and over a wide range and the current gaze direction is toward the driving surface or immediately adjacent thereto, the current attentiveness value or score may be determined to be high. As another example, where the heat map indicates that the occupant has been focusing more on only off-road locations—e.g., toward sidewalks, buildings, landscapes, etc.—and the current gaze is also toward a side of the vehicle 500 (e.g., where the actual driving surface is only in the periphery of the field of view of the occupant), the attentiveness score may be low at least for the eye tracking based information—e.g., the occupant may be determined to be daydreaming or in a blank stare state.

In some examples, as described in more detail herein, the attentiveness determiner 108 may use outputs of the comparator 120 to determine attentiveness. For example, where some number of objects—e.g., VRUs, traffic signs, wait conditions, etc.—have been identified using external perception of the vehicle 500, the number of those objects that are seen and/or processed by the occupant may be determined over some period of time. For example, where 30 objects have been detected, and the occupant has seen and/or processed 28 of them—e.g., as determined by the comparator 120 using the outputs of the FOV projector 116 and the outputs 114 of the DNN(s) 112—the occupant's attentiveness may be determined to be high. Where the occupant only sees and/or processes 15 of the 30, however, the occupant's attentiveness may be determined to be low (at least with respect to the comparator 120 computation). In some embodiments, the determination of whether the occupant processes the objects may be based on other attentiveness factors and/or the cognitive load determination. For example, where a projection of the gaze (e.g., as determined from a computed gaze vector) or field of view of the occupant overlaps—at least partially—with the detected objects, the occupant may be determined to have seen the object. However, where other attentiveness information indicates the occupant is actually fixated at a particular gaze or has been momentarily looking down at their phone, or where the occupant is determined to have a high cognitive load, it may be determined that the occupant has not processed, registered, or paid attention to the object. In such examples, it may be determined that the attentiveness of the occupant is lower than if the occupant had processed or registered the object.

The attentiveness determiner 108, in addition to or alternatively from using the eye tracking information, may use the body tracking information from the body tracker 104 to determine attentiveness. For example, a pose, posture, activity, and/or other information about an occupant(s) may be used to determine attentiveness. As such, where a driver has two hands on the steering wheel, and has an upright posture, the body-based contribution of the driver for attentiveness may correspond to a high attentiveness value or score. To the contrary, where a driver has one hand on the steering wheel and the other holding their phone up in front of their face, a low attentiveness value or score may be determined, at least for the body-based contribution.

The cognitive load determiner 110 may be used to determine the cognitive load of the occupant(s). For example, the outputs from the body tracker 104 and/or the eye tracker 106 may be processed or analyzed by the cognitive load determiner 110 to generate a cognitive load value, score, or level. The cognitive load determiner 110 may execute one or more machine learning algorithms, deep neural networks, computer vison algorithms, image processing algorithms, mathematical algorithms, and/or the like to determine the cognitive load. For example, eye-based metrics such as pupil size (e.g., diameter) or other eye characteristics, eye movements, blink rate or other eye measurements, and/or other information may be used—e.g., by a computer vision algorithm and/or a DNN(s)—to compute a cognitive load value, score, or level (e.g., low, medium, high). For example, dilated pupils may indicate a high cognitive load and the cognitive load determiner 110 may use pupil size, in addition to other information, to determine the cognitive load score.

Road scanning behavior may also indicate a cognitive load—e.g., is the occupant attentive, or daydreaming. For example, where a heat map corresponding to road scanning patterns or behavior indicates that the occupant(s) has been scanning from left to right and throughout the scene, this information may indicate a lower cognitive load. However, where the occupant(s) is not scanning the road, or has fixated (e.g., in a blank stare state, while daydreaming, etc.) for periods of time on non-crucial portions of the environment—e.g., sidewalks, landscape, etc.—this may indicate a higher cognitive load. In some embodiments, environmental (e.g., weather, time of day, etc.) and/or driving conditions (e.g., traffic, road conditions, etc.) may be factored into the cognitive load determination (and/or the attentiveness determination), such that snow, sleet, hail, rain, direct sun, darkness, heavy traffic, and/or other conditions may affect the cognitive load determination. For example, for the same set of eye and/or body tracking information, the cognitive load may be determined to be low where the weather conditions are clear and there is light traffic and may be determined to be high where it is snowing and there is heavy traffic.

In some embodiments, the cognitive load and/or attentiveness of the occupant(s) may be based on a profile corresponding to the occupant(s). For example, over a current drive and/or one or more prior drives by the occupant(s), the eye tracking information, body tracking information, and/or other information of the occupant(s) may be monitored and used to determine a customized profile for the occupant(s) that indicates when the particular occupant(s) is attentive, inattentive, has a higher cognitive load, has a lower cognitive load, etc. For example, a first occupant may scan the road less, but may process objects and make the correct decisions more quickly or with higher frequency, while a second occupant may scan the road less, but may process objects and make correct decisions less quickly or with less frequency. As such, by customizing profiles for the first occupant and the second occupant, the first occupant may not be warned excessively while the second occupant may receive more frequent warnings to ensure safe driving when they are both performing similar road scanning behaviors. The profile of an occupant may also include increased granularity, such that the behavior of the occupant may be tracked over certain streets, highways, routes, weather conditions, etc., and this information may be used to determine the attentiveness and/or cognitive load of the occupant during future instances of traveling the same streets, highways, in the same weather, etc. In addition to cognitive load and/or attentiveness determinations, the occupant may be able to customize their profile to include certain notifications or other action types, objects that the occupant wants notifications for (e.g., a first occupant may not want notifications for crosswalks while a second occupant may), etc.

In some embodiments, the sensor data 102B may be applied to one or more deep neural networks (DNNs) 112 that are trained to compute various different outputs 114. Prior to application or input to the DNN(s) 112, the sensor data 102 may undergo pre-processing, such as to convert, crop, upscale, downscale, zoom in, rotate, and/or otherwise modify the sensor data 102. For example, where the sensor data 102B corresponds to camera image data, the image data may be cropped, downscaled, upscaled, flipped, rotated, and/or otherwise adjusted to a suitable input format for the respective DNN(s) 112. In some embodiments, the sensor data 102B may include image data representing an image(s), image data representing a video (e.g., snapshots of video), and/or sensor data representing representations of sensory fields of sensors (e.g., depth maps for LIDAR sensors, a value graph for ultrasonic sensors, etc.). In some examples, the sensor data 102B may be used without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)).

Although examples are described herein with respect to using the DNNs(s) 112 (and/or to using DNNs, computer vision algorithms, image processing algorithms, machine learning models, etc., with respect to the body tracker 104, the eye tracker 106, the attentiveness determiner 108, and/or the cognitive load determiner 110), this is not intended to be limiting. For example and without limitation, the DNN(s) 112 and/or the computer vision algorithms, image processing algorithms, machine learning models, etc. described herein with respect to the body tracker 104, the eye tracker 106, the attentiveness determiner 108, and/or the cognitive load determiner 110, may include any type of machine learning model or algorithm, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of algorithms or machine learning models.

As an example, the DNNs 112 may process the sensor data 102 to generate detections of lane markings, road boundaries, signs, poles, trees, static objects, vehicles and/or other dynamic objects, wait conditions, intersections, distances, depths, dimensions of objects, etc. For example, the detections may correspond to locations (e.g., in 2D image space, in 3D space, etc.), geometry, pose, semantic information, and/or other information about the detection. As such, for lane lines, locations of the lane lines and/or types of the lane lines (e.g., dashed, solid, yellow, white, crosswalk, bike lane, etc.) may be detected by a DNN(s) 112 processing the sensor data 102. With respect to signs, locations of signs or other wait condition information and/or types thereof (e.g., yield, stop, pedestrian crossing, traffic light, yield light, construction, speed limit, exits, etc.) may be detected using the DNN(s) 112. For detected vehicles, motorcyclists, and/or other dynamic actors or road users, the locations and/or types of the dynamic actors may be identified and/or tracked, and/or may be used to determine wait conditions in a scene (e.g., where a vehicle behaves a certain way with respect to an intersection, such as by coming to a stop, the intersection or wait conditions corresponding thereto may be detected as an intersection with a stop sign or a traffic light).

The outputs 114 of the DNN(s) 112 may undergo post-processing, in embodiments, such as by converting raw outputs to useful outputs—e.g., where a raw output corresponds to a confidences for each point (e.g., in LiDAR, RADAR, etc.) or pixel (e.g., for camera images) that the point or pixel corresponds to a particular object type, post-processing may be executed to determine each of the points or pixels that correspond to a single instance of the object type. This post-processing may include temporal filtering, weighting, outlier removal (e.g., removing pixels or points determined to be outliers), upscaling (e.g., the outputs may be predicted at a lower resolution than an input sensor data instance, and the output may be upscaled back to the input resolution), downscaling, curve fitting, and/or other post-processing techniques. The outputs 114—after post-processing, in embodiments—may be in either a 2D coordinate space (e.g., image space, LiDAR range image space, etc.) and/or may be in a 3D coordinate system. In embodiments where the outputs 114 are in 2D coordinate space and/or in 3D coordinate space other than 3D world space, the outputs 114 may be converted to a same coordinate system as the projected FOV output by the FOV projection 116 (e.g., to a 3D world space coordinate system with an origin at a location on the vehicle).

In some non-limiting examples, the DNN(s) 112 and/or the outputs 114 may be similar to those described in U.S. Non-Provisional application Ser. No. 16/286,329, filed on Feb. 26, 2019, U.S. Non-Provisional application Ser. No. 16/355,328, filed on Mar. 15, 2019, U.S. Non-Provisional application Ser. No. 16/356,439, filed on Mar. 18, 2019, U.S. Non-Provisional application Ser. No. 16/385,921, filed on Apr. 16, 2019, U.S. Non-Provisional Application No. 535,440, filed on Aug. 8, 2019, U.S. Non-Provisional application Ser. No. 16/728,595, filed on Dec. 27, 2019, U.S. Non-Provisional application Ser. No. 16/728,598, filed on Dec. 27, 2019, U.S. Non-Provisional application Ser. No. 16/813,306, filed on Mar. 9, 2020, U.S. Non-Provisional application Ser. No. 16/848,102, filed on Apr. 14, 2020, U.S. Non-Provisional application Ser. No. 16/814,351, filed on Mar. 10, 2020, U.S. Non-Provisional application Ser. No. 16/911,007, filed on Jun. 24, 2020, and/or U.S. Non-Provisional application Ser. No. 16/514,230, filed on Jul. 17, 2019, each of which is incorporated by reference herein in its entirety.

Figure 3:
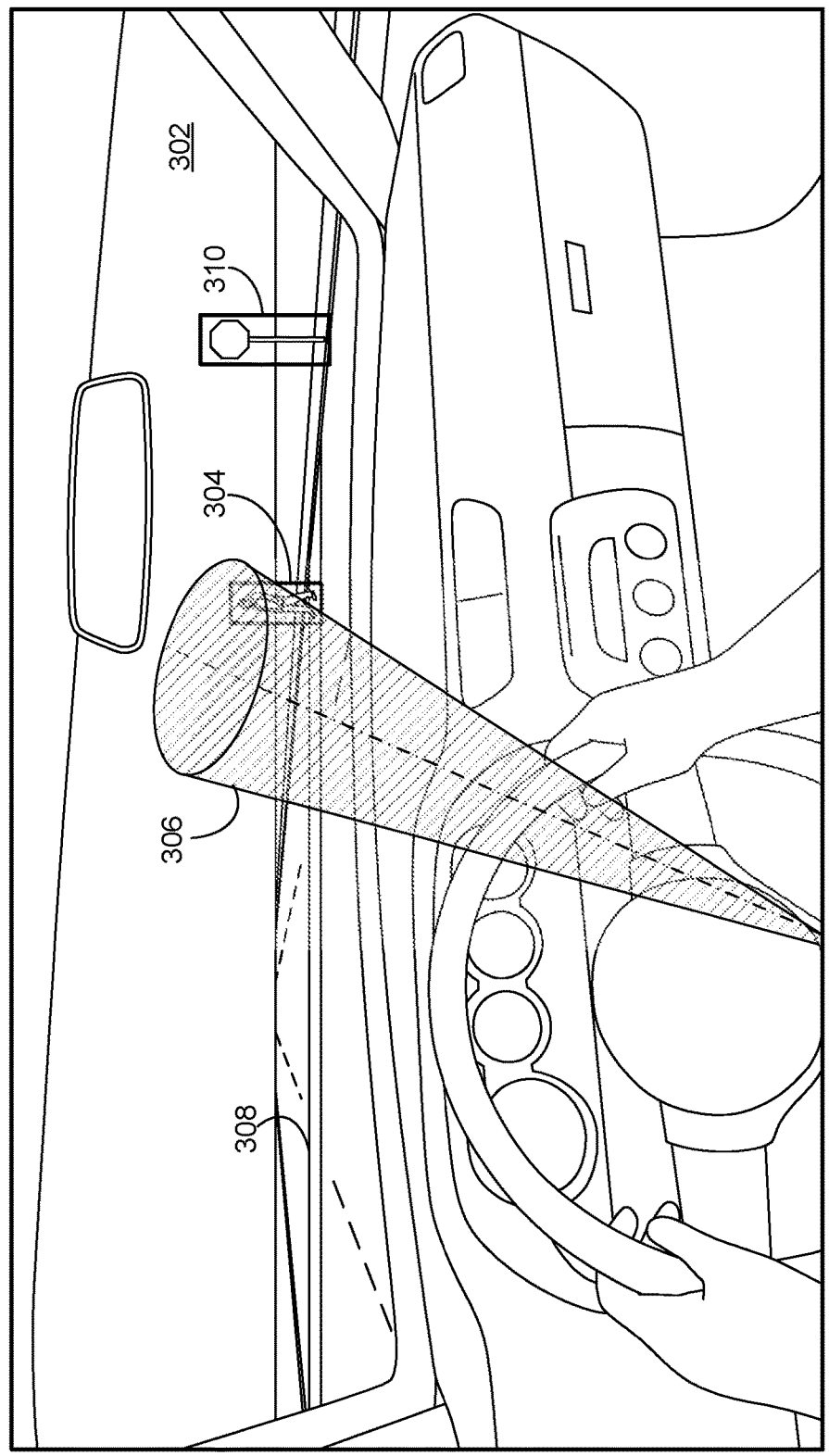
FIG. 3 depicts an example visualization of a gaze or field of view representation extended exterior to a vehicle for comparing vehicle perception to estimated occupant perception, in accordance with some embodiments of the present disclosure.

The FOV projector 116 may use the eye tracking information from the eye tracker 106 to determine a gaze direction and a projected gaze or field of view of the occupant(s). For example, with respect to FIG. 3, where an occupant is looking to the front right gaze region 214C (FIG. 2B), and particularly through a lower right portion of a windshield 302, a two-dimensional (2D) or three-dimensional (3D) (as illustrated) projection 306 of the field of view or gaze of the occupant may be generated and extended into the environment external to the vehicle 500. In addition, as described herein, the one or more DNNs 112 may process the sensor data 102B to generate outputs 114 that may be used—e.g., directly and/or after post-processing—to determine locations (e.g., bounding shapes, bounding contours, bounding boxes, points, pixels, etc.) of a person 304 (e.g., a VRU) and a sign 310 in the environment. Although a sign 310 and a person 304 are illustrated, this is not intended to be limiting, and the objects or information of interest in the environment may include any road, object, environmental, or other information, depending on the embodiment. For example, static objects, dynamic actors, intersections (or information corresponding thereto), wait conditions, lane lines, road boundaries, sidewalks, barriers, signs, poles, trees, landscape, information determined from a map (e.g., from an HD map), environmental conditions, and/or other information may be subject to an overlap comparison using the comparator 120.

For a non-limiting example, a first DNN 112 may be used to detect the sign 310 and a second DNN 112 may be used to detect the person 304. In other examples, a same DNN 112 may be used to detect both the sign 310 and the person 304. The projection 306 (and/or one or more additional projections corresponding to prior time steps or frames) may then be compared by the comparator 120 against the detected objects—e.g., the sign 310 and the person 304—to determine whether the occupant has seen the detected objects. Where an overlap occurs—at least partly—the occupant may be determined to have seen an object. In some embodiments, an overlap determination may include a threshold amount of overlap, such as 50% overlap (e.g., 50% of the bounding shape is overlapped by some portion of the projection 306), 70% overlap, 90% overlap, etc. In other embodiments, any amount of overlap may satisfy the overlap determination, or complete overlap may satisfy the overlap determination.

In order to determine the overlap, the projection 306 and the outputs 114 may be computed in—or converted to—a same coordinate system. For example, the projection 306 and the outputs 114 may be determined relative to a shared (e.g., world-space) coordinate system—e.g., with an origin at a location on the vehicle 500, such as on an axle (e.g., a center of a rear axle of the vehicle), a front bumper, a windshield, etc. As such, where the outputs 114 are computed in 2D image space, 3D space relative to a different origin, and/or otherwise in a 2D or 3D coordinate space that is not the shared coordinate space used by the comparator 120, the outputs 114 may be converted to the shared coordinate space.

Although illustrated as a narrow projection 306 (e.g., including a focus region of the field of view of the occupant), this is not intended to be limiting. For example, in some embodiments, the projection 306 may include a focus of the gaze within the field of view of the occupant in addition to some or all of the estimated periphery of the field of view of the occupant. In some embodiments, the overlap determination may be weighted based on the portion of the projection 306 that overlaps the object (e.g., a focus or center of a field of view may be more highly waited toward the determination that the occupant saw the object as compared to a periphery portion of the field of view). For example, where a portion of the projection 306 corresponding only to a periphery of a field of view of the occupant overlaps, the determination may be that the occupant has not seen the object, or some other criteria may also have to be met to determine the occupant has seen the object (e.g., a threshold of time in the periphery may have to be satisfied, a recency threshold may have to be satisfied—e.g., the object was in the periphery within the last second—etc.).

In some embodiments, where it has been determined that the occupant has seen the object(s), one or more additional criteria may be used by the comparator 120 to make a final determination. For example, duration (e.g., consecutive, cumulative over a period of time, etc.) and/or recency may be factored in. In such examples, to include an affirmative determination that the occupant has seen the object, the occupant may have to see the object (e.g., be determined to see the object using an overlap threshold) for a duration threshold—e.g., some number of frames, such as 5 or 10 frames, a period of time, such as half a second, a second, two seconds, etc. The duration may be a cumulative duration over a period of time or (sliding) time window, in some embodiments. For a non-limiting example, where the cumulative duration is one second and the period of time is five seconds, where an overlap occurs for a quarter of a second and then three seconds later another overlap occurs for three quarters of a second, the cumulative duration may be satisfied within the period of time and the occupant may be determined to have seen the object. In some examples, a recency determination may additionally or alternatively be used, such that the occupant may have to be determined to have seen the object within a time window. For example, the occupant may have to see the object within three seconds, five seconds, ten seconds, etc. of the current frame or time step in order for the final determination to be that the occupant has seen the object.

The comparator 120 may output, at each time step, a confidence (e.g., based on the amount of overlap, duration of overlap, recency of overlap, etc.) that the occupant(s) saw the object(s), an overlap value (e.g., percentage), an overlap duration, an overlap recency, and/or another value, score, or probability that the occupant(s) saw the object(s). This determination may be made for each object type and/or for each instance thereof. For example, where an action determination 124 includes a notification determiner, and the system is configured to issue a notification for unseen (and/or unprocessed) lane markers and a notification for unseen (and/or unprocessed) pedestrians, the comparator 120 may output predictions corresponding to each lane marker and predictions corresponding to each pedestrian (e.g., at each time step or frame). As such, the state machine 122 and/or the action determiner 124 determiner may generate outputs and/or make determinations corresponding to the lane markers, the pedestrians, or a combination thereof. As another example, where the action determiner 124 corresponds to one or more ADAS systems, state information corresponding to lane markers may correspond to different actions than state information corresponding to pedestrians. As such, separate outputs from the comparator 120 corresponding to different object types and/or instances thereof may be useful for the system in determining the state of the occupant(s) with respect to the particular object type or instance, as well as being useful to the action determiner 124 in determining a correct action(s) to execute (or refrain from executing).

The state machine 122 may receive, as input, outputs from the comparator 120, the attentiveness determiner 108, and/or the cognitive load determiner 110, and may determine a state of occupant(s)—e.g., the driver. In some examples, the state machine 122 may determine a single state (e.g., aware, distracted, focused, etc.) that may be used by the action determiner 124 when determining which action(s) to execute or refrain from executing (e.g., suppressing a notification). In other examples, the state machine 122 may determine a state with respect to each object type and/or instance thereof that may be used by the action determiner 124 to make determinations about one or more different types of actions. In some embodiments, the state machine 122 may determine a state(s) based on various levels or processing—e.g., a hierarchical state determination process. For example, an unaware or inattentive state may be determined where an overlap threshold(s) (e.g., overlap amount, overlap duration, overlap recency, etc.) has not been met—e.g., indicating that the occupant(s) may not have seen and/or processed the object(s). In such an example, a next level—e.g., to process the outputs from the attentiveness determiner 108 and/or the cognitive load determiner 110—of processing may not be executed. As such, where an occupant has not been determined by the comparator 120 to have seen the object—such as a VRU—the actions that would be executed as a result of not seeing the object may be executed (e.g., to generate and/or output a notification or warning, to activate an ADAS system, such as an automatic emergency braking (AEB) system, etc.).

In some embodiments, even where the overlap threshold(s) has not been met, the state machine 122 may still process the outputs from the attentiveness determiner 108 and/or the cognitive load determiner 110 to determine a combined state—e.g., attentive (e.g., road scanning behavior indicates attentiveness) but unaware (e.g., the overlap threshold(s) was not met and the occupant(s) may not have seen the object(s)). In such an example, a different tier or type of action may be executed. In the above example with an AEB system, where the occupant(s) is determined to be attentive (and/or to have a low cognitive load) but unaware, the AEB system may not be executed but the notification or warning may be generated and output to the occupant(s)—e.g., audibly, tactilely, visually, and/or otherwise. In an example where the overlap threshold(s) have not been met and the attentiveness is low and/or cognitive load is high, more preventative actions may be taken. For example, a notification may be output, an ADAS system may be executed, and/or—where the vehicle 500 is an autonomous capable vehicle—autonomous control may be taken over (e.g., to execute a safety maneuver, such as to pull over to the side of the road).

Where an overlap threshold(s) is met—e.g., indicating that the driver has seen the object(s)—the state machine 122 may use the outputs from the attentiveness determiner 108 and/or the cognitive load determiner 110 to determine a final state. For example, where the occupant(s) is aware—e.g., as indicated by the overlap information from the comparator 120—the attentiveness score, value, level, etc. and/or the cognitive load score, value, level, etc. may be analyzed by the state machine 122 to determine the final state. As such, even where the occupant(s) is determined to have seen the object(s) (e.g., pedestrian, vehicle, wait condition, intersection, pole, sign, etc.), the state machine 122 may be used to determine the ability (e.g., based on cognitive load) or likelihood (e.g., based on attentiveness) of the occupant(s) to have processed the perception of the object(s). For example, where a driver sees a vehicle (e.g., is determined to have seen based on a comparison of the estimated field of view of the driver and the location of the vehicle) some distance in front of the ego-vehicle 500, but is determined to have a high cognitive load and/or low attentiveness (e.g., based on the heat map, fixations, etc.), the state may include aware (e.g., of the vehicle) but inattentive (e.g., potentially has not processed the presence of the vehicle). In such examples, the action determiner 124 may execute the actions as if the occupant(s) was unaware of the object(s), and/or may issue a lower level action—such as to issue a notification or warning and not to execute an ADAS system (e.g., AEB).

In some embodiments, the state determination(s) of the state machine 122 may factor in environmental conditions (e.g., weather, time of day, etc.) and/or driving conditions (e.g., traffic, road conditions, etc.) when determining the state. For example, in some embodiments, the attentiveness, cognitive load, and/or overlap determination may factor in the environmental and/or driving conditions, and the state machine 122 may determine the state based on this information. In other embodiments, in addition to or alternatively from the attentiveness determiner 108, the cognitive load determiner 110, and/or the comparator 120 factoring in the environment and/or driving conditions, the state machine 122 may factor in environmental and/or driving conditions when determining the state. For example, certain values, scores, and/or levels of attentiveness may indicate an aware and/or attentive driver when the weather is clear and it is light outside (e.g., daytime), but may indicate an unaware and/or inattentive driver when it is snowing and/or it is dark outside (e.g., nighttime).

The action determiner 124 may include or be part of a warning and notification system, an ADAS system, a control system or control layer of an autonomous driving software stack, a planning system or layer of the autonomous driving stack, a collision avoidance system or layer or the autonomous driving stack, an actuation system or layer of the autonomous driving stack, etc. The action determiner 124 may execute different actions dependent on the subject (or object) that the state corresponds to. As non-limiting examples, for dynamic objects on the driving surface (e.g., vehicles, pedestrians, bicyclists, etc.), the action determiner 124 may determine notification types, ADAS systems to execute or engage, autonomous systems to execute or engage, etc. For objects off of the road, such as poles, pedestrians, and/or the like, the action determiner 124 may determine notification types but may not engage any ADAS or autonomous functions unless the vehicle 500 is also currently off of the road or headed off the road. For wait conditions (e.g., street lights, stop signs, etc.), the action determiner 124 may determine notification types and/or ADAS systems to execute or engage—e.g., to stop the vehicle 500 at a stop light where the light is red and the occupant(s) is determined to have not seen the red light.

Figure 4:
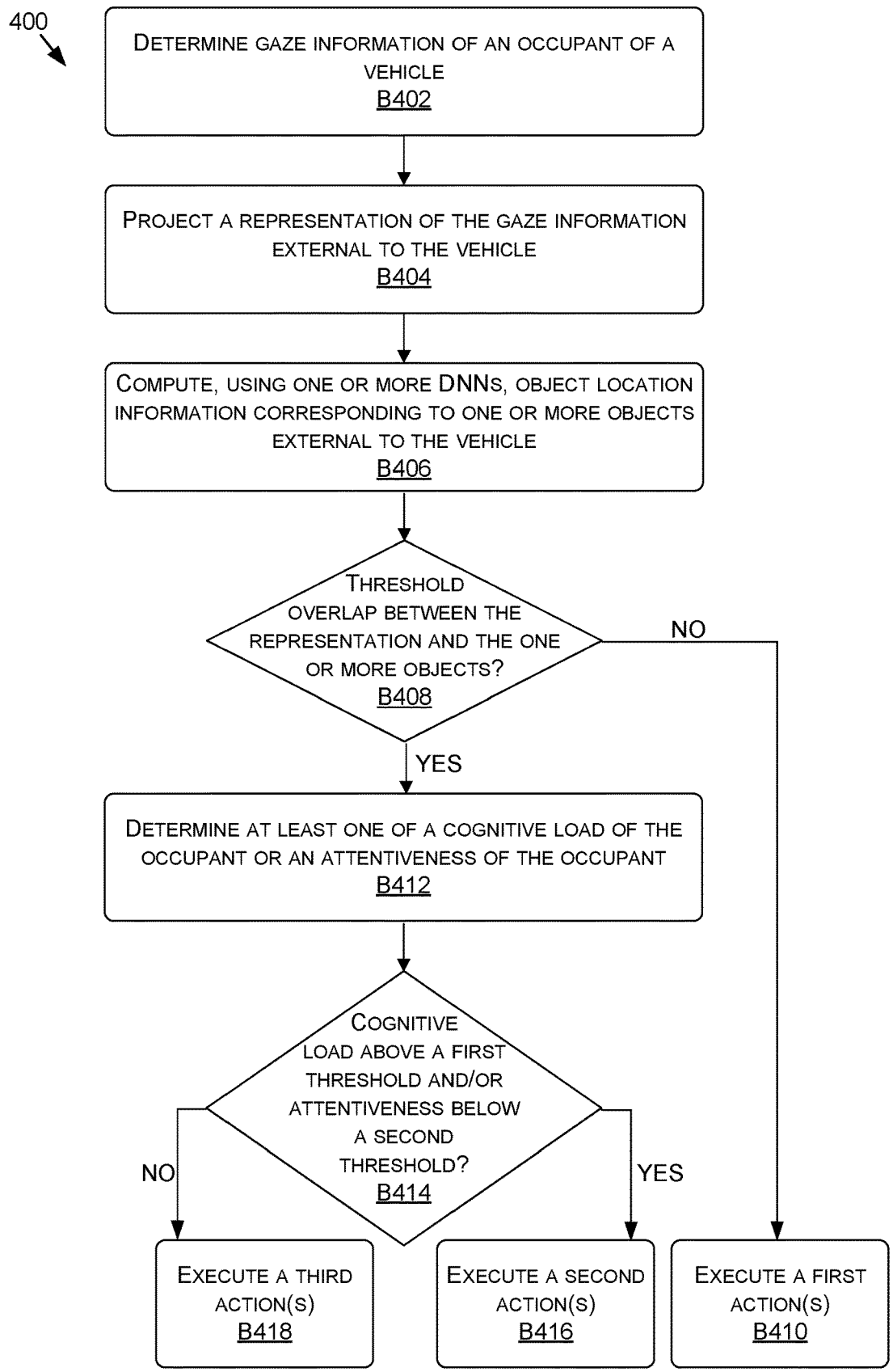
FIG. 4 is a flow diagram showing a method for determining an action(s) based on driver attentiveness and/or cognitive load, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the process 100 of FIG. 1. However, this method 400 may additionally or alternatively be executed by any one process and/or any one system, or any combination of processes and/or systems, including, but not limited to, those described herein.

FIG. 4 is a flow diagram showing a method 400 for determining an action(s) based on driver attentiveness and/or cognitive load, in accordance with some embodiments of the present disclosure. The method 400, at block B402, includes determining gaze information of an occupant of a vehicle. For example, the eye tracker 106 may determine gaze information (e.g., a gaze vector) and/or other information that may be used to determine a current gaze or field of view of an occupant—such as a driver—of the vehicle 500.

The method 400, at block B404, includes projecting a representation of the gaze information external to the vehicle. For example, a projection (e.g., projection 306 of FIG. 3) may be generated based on the gaze information, where the projection may correspond to at least a portion of the field of view of the occupant.

The method 400, at block B406, includes computing, using one or more DNNs, object location information corresponding to one or more objects external to the vehicle. For example, one or more DNN(s) 112 may be used to compute locations and/or semantic information corresponding to one or more objects, subjects, and/or other information in the environment external to the vehicle 500. For non-limiting examples, locations and/or semantic information about dynamic actors, static objects, wait conditions, lane lines, road boundaries, poles, and/or signs may be computed using the DNN(s) 112.

The method 400, at block B408, includes determining whether a threshold overlap between the representation and the one or more objects is satisfied. For example, the comparator 120 may compare the representation of the gaze (e.g., the projection 306) to an object(s) in the environment—e.g., within a same coordinate system—to determine whether a threshold amount of overlap occurs. The threshold amount of overlap may also include determining whether the overlap occurred within a time window from the current time, for a cumulative amount of time within a time window, and/or for a long enough consecutive duration of time.

Where the threshold overlap is not satisfied at block B408, the method 400 may proceed to block B410. Block B410 includes executing a first action(s). For example, where there is not a threshold amount of overlap (and/or other thresholds are not met, such as recency, duration, etc.), which may indicate that the occupant did not see the object(s), a first action(s) may be executed. For example, a warning or notification may be generated and output, one or more ADAS systems may be activated, and/or the like.

Where the threshold overlap is satisfied at block B408, the method 400 may proceed to block B412. Block B412 includes determining at least one of a cognitive load of the occupant or an attentiveness of the occupant. For example, due to the overlap threshold being satisfied—e.g., indicating that the occupant saw the object(s)—the cognitive load determiner 110 may determine the cognitive load of the occupant and/or the attentiveness determiner 108 may determine an attentiveness of the occupant. This information may be used, at block B414, to determine whether the occupant was able to process the perception of the object(s).

The method 400, at block B414, includes determining whether a cognitive load is above a first threshold and/or attentiveness is below a second threshold. For example, where the cognitive load is above the first threshold—e.g., indicating that the occupant is currently not as capable of processing the perception of the object(s)—the method 400 may proceed to block B416. Similarly, where the attentiveness is below a second threshold—indicating that the occupant is currently not as capable of processing the perception of the object(s)—the method 400 may proceed to block B416. In some embodiments, some combination of attentiveness and cognitive load may be used to determine to proceed to block B416. Block B416 includes executing a second action(s). For example, the second action(s) may be, in embodiments, the same as the first action(s). As such, where the occupant is determined not to have seen the object(s) at block B408 and/or where the occupant is determined to have seen the object(s) but not fully processed the object—e.g., due to a high cognitive load and/or low attentiveness—the action(s) executed may be the same. In some embodiments, however, the second action(s) may be different than the first action(s). For example, where the occupant is determined to have seen the object(s), but the determination at block B414 is that the occupant may not have fully processed the object(s), a notification or warning may be issued but one or more ADAS systems may not be executed (at least initially). As another example, the first action(s) may include an audible and visual warning, and the second action(s) may include only a visual warning—e.g., a less severe warning since the occupant has been determined to have seen the object(s).

As another example, where the cognitive load is below the first threshold—e.g., indicating that the occupant is currently more capable of processing the perception of the object(s)—the method 400 may proceed to block B418. Similarly, where the attentiveness is above the second threshold—e.g., indicating that the occupant is currently more capable of processing the perception of the object(s)—the method 400 may proceed to block B418. Block B418 includes executing a third action(s). For example, where the cognitive load is low and/or the attentiveness is high, and the occupant has been determined to have seen the object(s) at block B408, the third action(s) may be executed. In some embodiments, the third action(s) may include executing no action, or suppressing an action—e.g., suppressing a notification(s).

As such, where an occupant is determined to have seen an object(s) and have a low cognitive load and/or high attentiveness, the notifications, ADAS systems, and/or other actions may be suppressed in order to reduce the number of warnings, notifications, and/or autonomous or semi-autonomous activations of the vehicle. As such, the process 100 and/or the method 400 may execute a hierarchical decision tree to determine the actions to take based on a state of the occupant(s).

Example Autonomous Vehicle

Figure 5A:
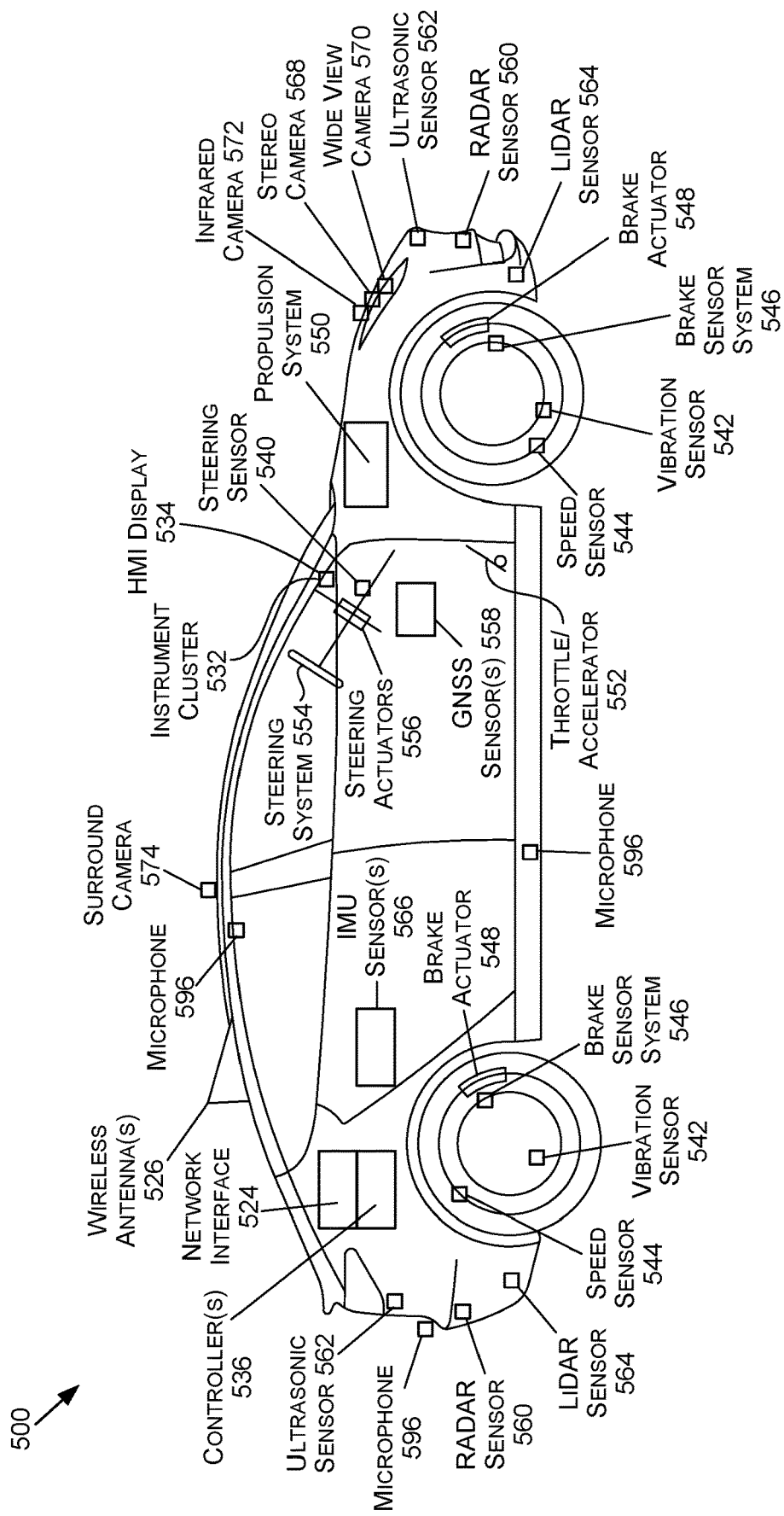
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LiDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
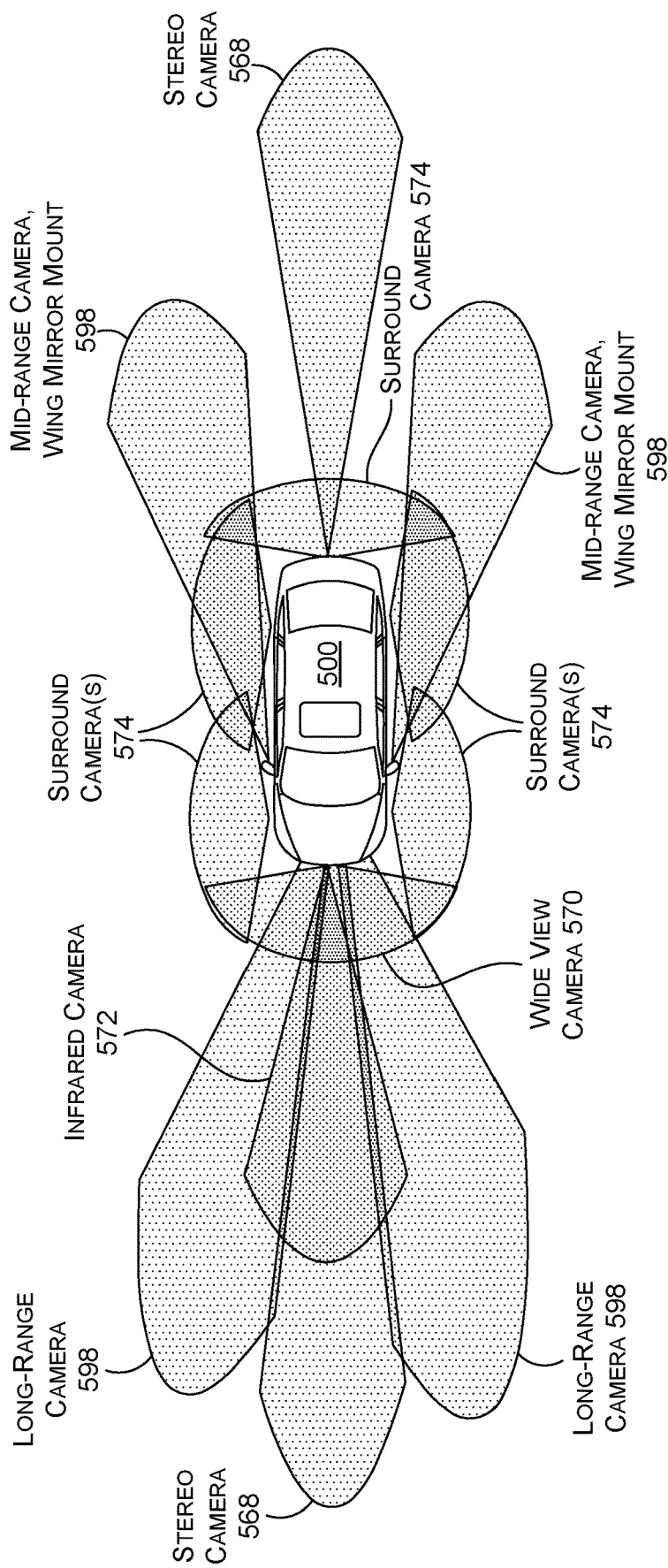
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting.

For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
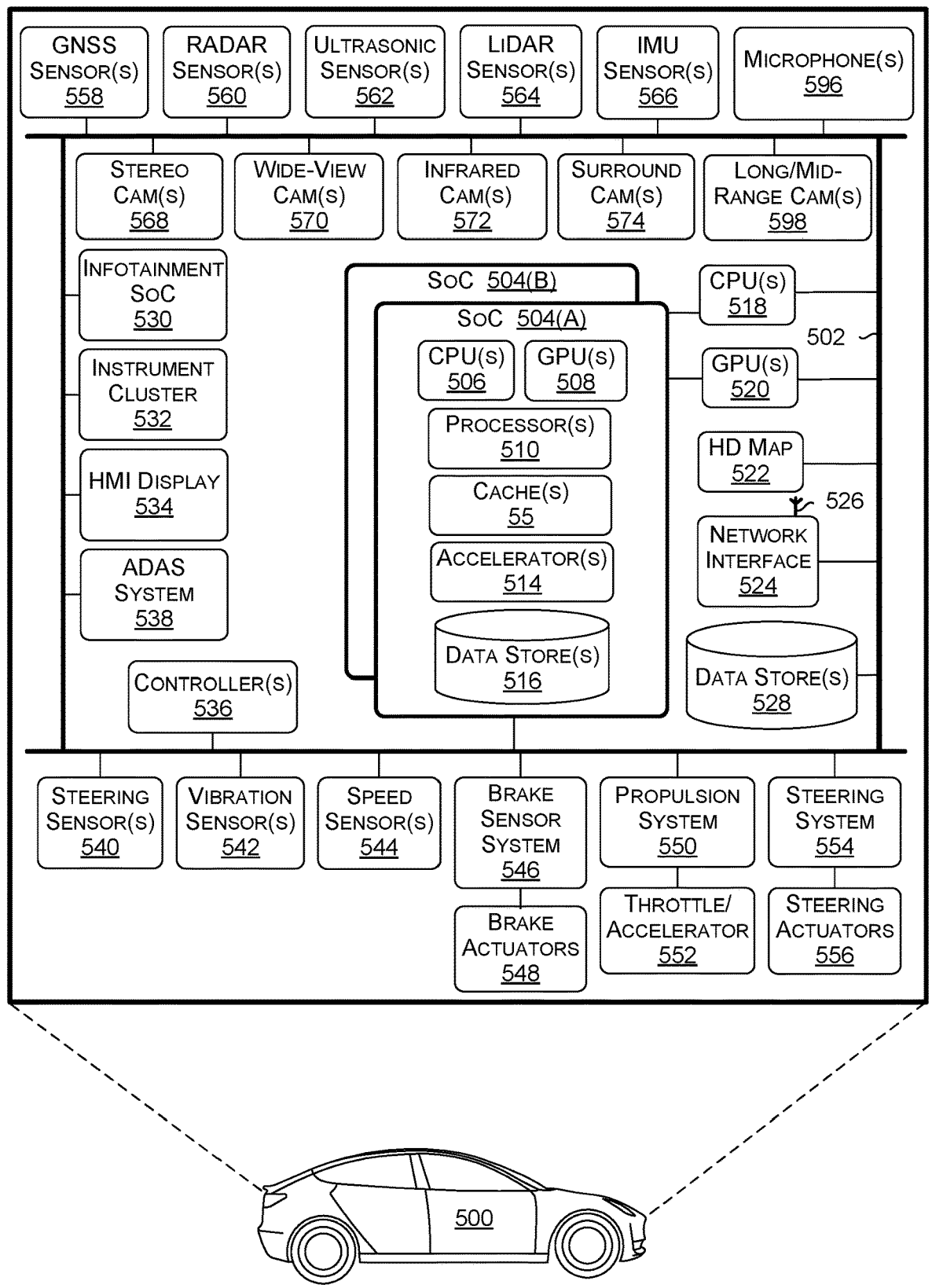
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LiDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LiDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK).

The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LiDAR sensor(s) 564. The LiDAR sensor(s) 564 may be used for object and pedestrian detection, emergency braking, collision avoidance, and/or other functions. The LiDAR sensor(s) 564 may be functional safety level ASIL B. In some examples, the vehicle 500 may include multiple LiDAR sensors 564 (e.g., two, four, six, etc.) that may use Ethernet (e.g., to provide data to a Gigabit Ethernet switch).

In some examples, the LiDAR sensor(s) 564 may be capable of providing a list of objects and their distances for a 360-degree field of view. Commercially available LiDAR sensor(s) 564 may have an advertised range of approximately 500 m, with an accuracy of 2 cm-3 cm, and with support for a 500 Mbps Ethernet connection, for example. In some examples, one or more non-protruding LiDAR sensors 564 may be used. In such examples, the LiDAR sensor(s) 564 may be implemented as a small device that may be embedded into the front, rear, sides, and/or corners of the vehicle 500. The LiDAR sensor(s) 564, in such examples, may provide up to a 120-degree horizontal and 35-degree vertical field-of-view, with a 200 m range even for low-reflectivity objects. Front-mounted LiDAR sensor(s) 564 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 500. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LiDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
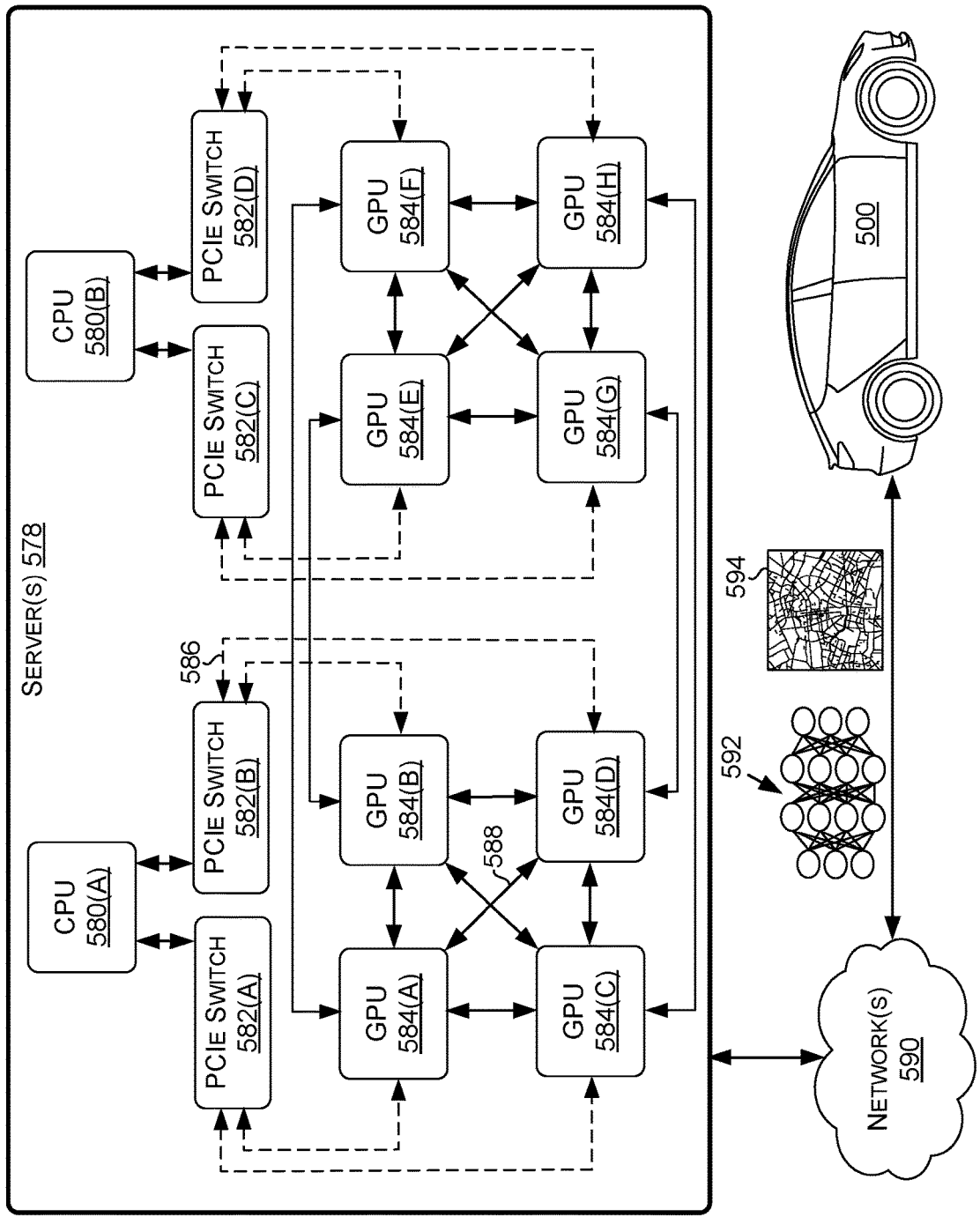
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
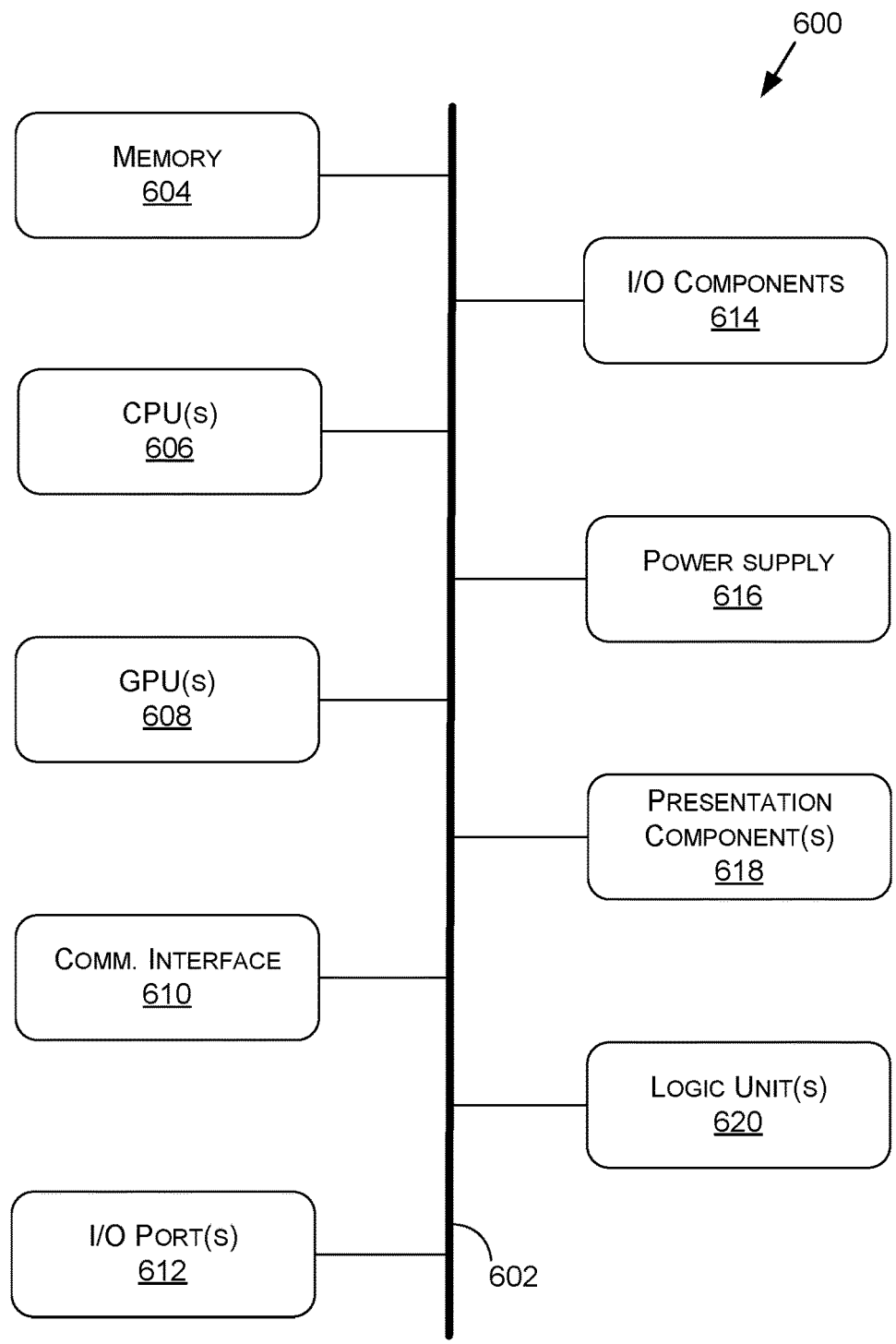
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
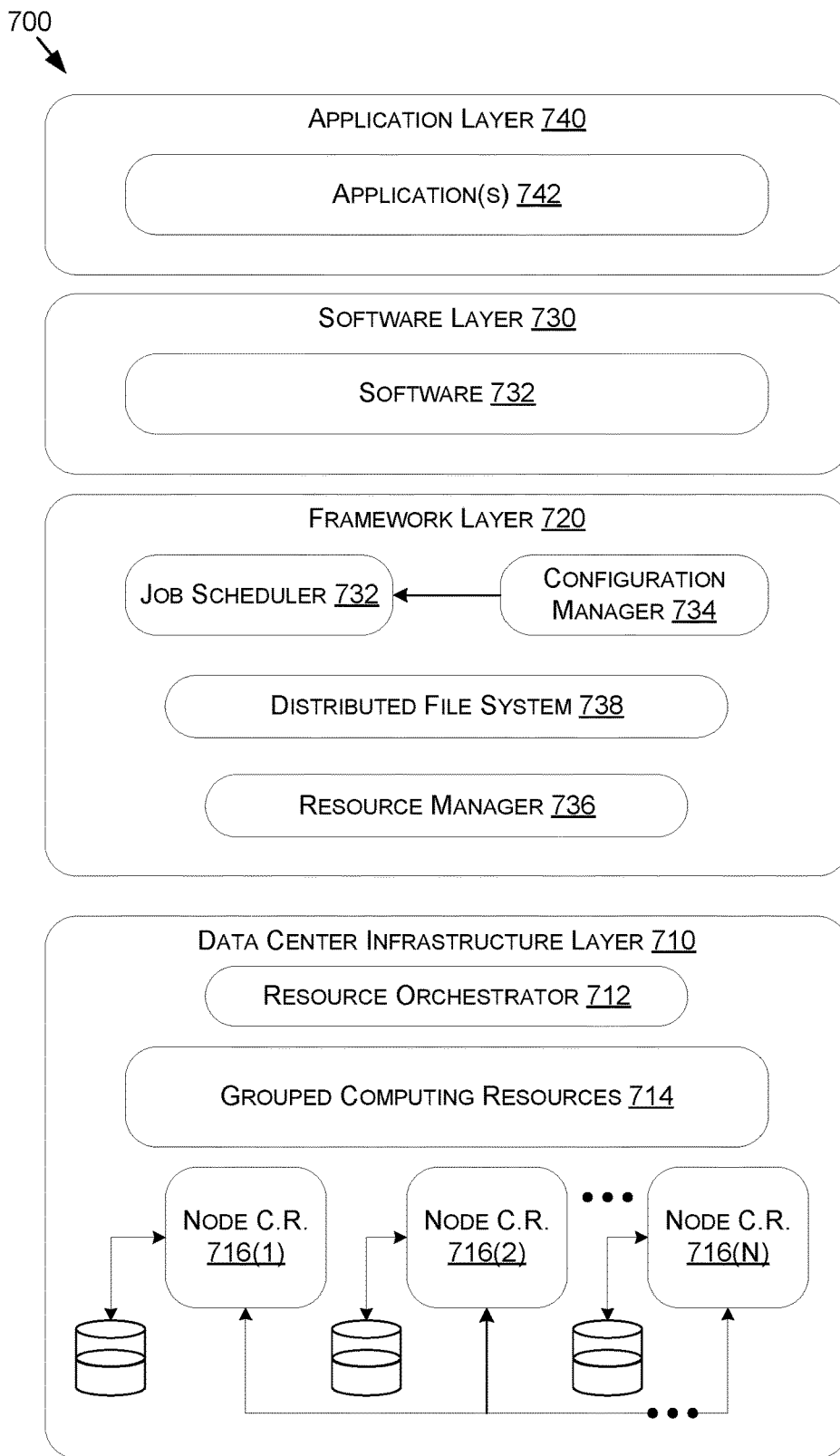
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, and/or other processors may be grouped within one or more racks to provide compute resources to support one or more workloads. The one or more racks may also include any number of power modules, cooling modules, and/or network switches, in any combination.

The resource orchestrator 722 may configure or otherwise control one or more node C.R.s 716(1)-716(N) and/or grouped computing resources 714. In at least one embodiment, resource orchestrator 722 may include a software design infrastructure ("SDI") management entity for the data center 700. The resource orchestrator 722 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 1036 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining, based at least on first sensor data generated using one or more first sensors of a vehicle, a gaze direction of an occupant;
   generating, in a world space coordinate system, a representation of the gaze direction;
   determining, in the world space coordinate system and based at least on second sensor data generated using one or more second sensors of the vehicle, an object location of at least one object;
   comparing the representation of the gaze direction to the object location; and
   performing one or more operations based at least on the comparing.

2. The method of claim 1, wherein the performing the one or more operations includes performing one of:
   when the representation overlaps the object location more than a threshold amount, suppressing a notification; or
   when the representation does not overlap the object location more than the threshold amount, generating the notification.

3. The method of claim 1, wherein the one or more first sensors includes at least one first sensor with a field of view of the occupant interior to the vehicle and the one or more second sensors includes at least one second sensor with a field of view external to the vehicle.

4. The method of claim 1, further comprising:
   monitoring eye movement of the occupant of the vehicle to determine one or more of gaze patterns, saccade velocities, fixations, or smooth pursuits; and
   determining, based at least on one or more of the gaze patterns, the saccade velocities, the fixation behaviors, or the smooth pursuit behaviors, an attentiveness score of the occupant,
   wherein the performing the one or more operations is further based at least in part on the attentiveness score.

5. The method of claim 1, further comprising:
   generating a heat map corresponding to road scanning behavior of the occupant of the vehicle over a period of time,
   wherein the performing the one or more operations is further based at least on the heat map.

6. The method of claim 1, further comprising:
   based at least on a least one of eye movements, eye measurements, or eye characteristics of the occupant of the vehicle, determining a cognitive load score of the occupant,
   wherein the performing the one or more operations is further based at least in part on the cognitive load score.

7. The method of claim 6, wherein the determining the cognitive load score is based at least on a cognitive load profile corresponding to the occupant, the cognitive load profile generated during one or more drives including the occupant.

8. The method of claim 1, wherein the determining the object location includes applying the second sensor data to one or more deep neural networks (DNNs) configured to compute data indicative of the object location.

9. The method of claim 1, further comprising:
   determining one or more of a posture, a gesture, or an activity being performed by the occupant,
   wherein the performing the one or more operations is further based at least on one or more of the posture, the gesture, or the activity.

10. A system comprising:
    one or more processing units to:
       determine, based at least on first sensor data generated using a first subset of one or more sensors, a gaze direction of an occupant;
       generate, in a coordinate system, a representation of the gaze direction;
       determine, in the coordinate system and based at least on second sensor data generated using a second subset of the one or more sensors, an object location of at least one object;
       compare the representation of the gaze direction to the object location; and
       determine to generate a notification or suppress the notification based at least on the comparing.

11. The system of claim 10, wherein the first subset of the one or more sensors includes at least one first sensor with a field of view of the occupant interior to a vehicle and the second subset of the one or more sensors includes at least one second sensor with a field of view external to the vehicle.

12. The system of claim 10, wherein the one or more processing units are further to:
    monitor eye movement of the occupant of a vehicle to determine one or more of gaze patterns, saccade velocities, fixation behaviors, or smooth pursuit behaviors;
    determine, based at least on one or more of the gaze patterns, the saccade velocities, the fixation behaviors, or the smooth pursuit behaviors, one or more of an attentiveness score or a cognitive load score of the occupant,
    wherein the determination to generate the notification or suppress the notification is further based at least on one or more of the attentiveness score of the cognitive load score.

13. The system of claim 10, wherein the system is comprised in at least one of:
    a control system for an autonomous or semi-autonomous machine;
    a perception system for an autonomous or semi-autonomous machine;
    a system for performing simulation operations;
    a system for performing deep learning operations;
    a system implemented using an edge device;

a system incorporating one or more virtual machines (VMs);

a system implemented using a robot;

a system implemented at least partially in a data center; or a system implemented at least partially using cloud computing resources.

14. A processor comprising:

one or more processing units to:

determine, based at least on first sensor data generated using one or more first sensors of a vehicle, a gaze direction of an occupant;

generate, in a world space coordinate system, a representation of the gaze direction;

determine, in the world space coordinate system and based at least on second sensor data generated using one or more second sensors of the vehicle, an object location of at least one object;

compare the representation of the gaze direction to the object location; and perform one or more operations based at least on the comparing.

15. The processor of claim 14, wherein the performance of the one or more operations includes performing one of:

when the representation overlaps the object location more than a threshold amount, suppressing a notification; or when the representation does not overlap the object location more than the threshold amount, generating the notification.

16. The processor of claim 14, wherein the one or more first sensors includes at least one first sensor with a field of view of the occupant interior to the vehicle and the one or more second sensors includes at least one second sensor with a field of view external to the vehicle.

17. The processor of claim 14, wherein the one or more processing units are further to:

monitor eye movement of the occupant of the vehicle to determine one or more of gaze patterns, saccade velocities, fixation behaviors, or smooth pursuit behaviors; and determine, based at least on one or more of the gaze patterns, the saccade velocities, the fixation behaviors, or the smooth pursuit behaviors, an attentiveness score of the occupant, wherein the performance of the one or more operations is further based at least in part on the attentiveness score.

18. The processor of claim 14, wherein the one or more processing units are further to:

generate a heat map corresponding to road scanning behavior of the occupant of the vehicle over a period of time, wherein the performance of the one or more operations is further based at least on the heat map.

19. The processor of claim 14, wherein the one or more processing units are further to:

based at least on a least one of eye movements, eye measurements, or eye characteristics of the occupant of the vehicle, determine a cognitive load score of the occupant, wherein the performance of the one or more operations is further based at least in part on the cognitive load score.

20. The processor of claim 19, wherein the determination of the cognitive load score is based at least on a cognitive load profile corresponding to the occupant, the cognitive load profile generated during one or more drives including the occupant.

* * * * *